US012067943B2

(12) United States Patent
Huang et al.

(10) Patent No.: US 12,067,943 B2
(45) Date of Patent: Aug. 20, 2024

(54) PIXEL CIRCUIT, DRIVING METHOD FOR SAME, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yao Huang, Beijing (CN); Rui Wang, Beijing (CN); Benlian Wang, Beijing (CN); Haigang Qing, Beijing (CN); Zhi Wang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/471,324

(22) Filed: Sep. 21, 2023

(65) Prior Publication Data

US 2024/0013721 A1 Jan. 11, 2024

Related U.S. Application Data

(63) Continuation of application No. 17/608,746, filed as application No. PCT/CN2021/076536 on Feb. 10, 2021, now Pat. No. 11,810,506.

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01);
(Continued)

(58) Field of Classification Search
None
See application file for complete search history.

(56) References Cited

U.S. PATENT DOCUMENTS

2015/0049126 A1 2/2015 Jung
2017/0301293 A1 10/2017 Zhu et al.
(Continued)

FOREIGN PATENT DOCUMENTS

CN 105427807 A 3/2016
CN 106558287 A 4/2017
(Continued)

OTHER PUBLICATIONS

International Search Report for PCT/CN2021/076536 mailed Oct. 15, 2021.

(Continued)

*Primary Examiner* — Stephen T. Reed
(74) *Attorney, Agent, or Firm* — Ling Wu; Stephen Yang; Ling and Yang Intellectual Property

(57) ABSTRACT

A pixel circuit, a driving method for same, and a display apparatus are provided. The pixel circuit includes a driving sub-circuit, a writing sub-circuit, a compensation sub-circuit, a first reset sub-circuit, an emitting element. The driving sub-circuit provides a driving current for a third node under control of signals of first and second nodes. The writing sub-circuit writes a signal of the data signal terminal into the second node under control of a signal of a second scanning signal terminal. The first reset sub-circuit writes an initial voltage signal of a first initial signal terminal into the third node under control of a first scanning signal terminal and a first emitting control signal terminal. The compensation sub-circuit writes the initial voltage signal of the third node into the first node under control of a third scanning signal terminal, compensates the first node under control of the third scanning signal terminal.

20 Claims, 12 Drawing Sheets

(52) U.S. Cl.
CPC ............... *G09G 2320/0233* (2013.01); *G09G 2320/0247* (2013.01)

(56) References Cited

U.S. PATENT DOCUMENTS

| | | | | |
|---|---|---|---|---|
| 2018/0166516 | A1 | 6/2018 | Chai et al. | |
| 2018/0226025 | A1 | 8/2018 | Wu et al. | |
| 2019/0244569 | A1 | 8/2019 | Sun et al. | |
| 2020/0184893 | A1 | 6/2020 | Dong | |
| 2021/0082339 | A1* | 3/2021 | Zhang .................. | G09G 3/2092 |
| 2021/0104196 | A1 | 4/2021 | Yuan | |
| 2021/0280132 | A1* | 9/2021 | Gao ..................... | G09G 3/3233 |
| 2021/0312866 | A1 | 10/2021 | Fan et al. | |
| 2021/0366363 | A1 | 11/2021 | Lee et al. | |
| 2021/0375198 | A1 | 12/2021 | Zhang et al. | |

FOREIGN PATENT DOCUMENTS

| | | | |
|---|---|---|---|
| CN | 108206008 | A | 6/2018 |
| CN | 108231001 | A | 6/2018 |
| CN | 109427292 | A | 3/2019 |
| CN | 110176213 | A | 8/2019 |
| CN | 110264946 | A | 9/2019 |
| CN | 110313028 | A | 10/2019 |
| CN | 111489701 | A | 8/2020 |
| CN | 111739471 | A | 10/2020 |
| CN | 111798789 | A | 10/2020 |
| CN | 111883043 | A | 11/2020 |
| CN | 112102785 | A | 12/2020 |
| CN | 112233619 | A | 1/2021 |

OTHER PUBLICATIONS

Notice of Allowance dated Jul. 6, 2023 for U.S. Appl. No. 17/608,746.

* cited by examiner

PIXEL CIRCUIT, DRIVING METHOD FOR SAME, AND DISPLAY APPARATUS

CROSS-REFERENCE TO RELATED APPLICATION(S)

This application is a continuation of U.S. application Ser. No. 17/608,746 filed Nov. 3, 2021, which is U.S. National Phase Entry of PCT Application No. PCT/CN2021/076536 having an international filing date of Feb. 10, 2021, which are hereby incorporated herein by reference in their entireties.

TECHNICAL FIELD

Embodiments of the present disclosure relate, but are not limited, to the technical field of display, and particularly to a pixel circuit, a driving method for the same, and a display apparatus.

BACKGROUND

As active light emitting display devices, Organic Light Emitting Diodes (OLED) have the advantages of self-illumination, wide viewing angle, high contrast, low power consumption, extremely quick response, etc., and have been widely applied to display products such as mobile phones, tablet computers, and digital cameras. OLED displaying is current-driven, and a current needs to be output to an OLED through a pixel circuit to drive the OLED to emit light.

SUMMARY

The below is a summary about the subject matter described in the present disclosure in detail. The summary is not intended to limit the scope of protection of the claims.

An exemplary embodiment of the present disclosure provides a pixel circuit, which includes a driving sub-circuit, a writing sub-circuit, a compensation sub-circuit, a first reset sub-circuit, a first emitting control sub-circuit, the second emitting control sub-circuit, and an emitting element. The driving sub-circuit is connected with a first node, a second node, and a third node respectively, and is configured to provide a driving current for the third node under the control of signals of the first node and the second node. The writing sub-circuit is connected with a second scanning signal terminal, a data signal terminal, and the second node respectively, and is configured to write a signal of the data signal terminal into the second node under the control of a signal of the second scanning signal terminal. The compensation sub-circuit is connected with a first voltage terminal, a third scanning signal terminal, the first node, and the third node respectively, and is configured to write a signal of the third node into the first node under the control of a signal of the third scanning signal terminal and compensate the first node under the control of the signal of the third scanning signal terminal and a signal of the first voltage terminal. The first reset sub-circuit is connected with a first scanning signal terminal, a first emitting control signal terminal, a first initial signal terminal, and the third node respectively, and is configured to write a signal of the first initial signal terminal into the third node under the control of signals of the first scanning signal terminal and the first emitting control signal terminal. The second emitting control sub-circuit is connected with the first voltage terminal, a second emitting control signal terminal, and the second node respectively, and is configured to provide the signal of the first voltage terminal for the second node under the control of a signal of the second emitting control signal terminal. The first emitting control sub-circuit is connected with the first emitting control signal terminal, the third node, and a fourth node respectively, and is configured to provide the signal of the third node for the fourth node under the control of the signal of the first emitting control signal terminal and allow the driving current to flow between the third node and the fourth node. One terminal of the emitting element is connected with the fourth node, while the other terminal is connected with a second voltage terminal.

In an exemplary embodiment, the first reset sub-circuit includes a first transistor and a seventh transistor. A control electrode of the first transistor is connected with the first scanning signal terminal. A first electrode of the first transistor is connected with the first initial signal terminal. A second electrode of the first transistor is connected with a first electrode of the seventh transistor. A control electrode of the seventh transistor is connected with the first emitting control signal terminal. A second electrode of the seventh transistor is connected with the third node.

In an exemplary embodiment, the compensation sub-circuit includes a second transistor and a first capacitor. The driving sub-circuit includes a third transistor. The writing sub-circuit includes a fourth transistor. A control electrode of the second transistor is connected with the third scanning signal terminal. A first electrode of the second transistor is connected with the third node. A second electrode of the second transistor is connected with the first node. One terminal of the first capacitor is connected with the first node, and the other terminal of the first capacitor is connected with the first voltage terminal. A control electrode of the third transistor is connected with the first node. A first electrode of the third transistor is connected with the second node. A second electrode of the third transistor is connected with the third node. A control electrode of the fourth transistor is connected with the second scanning signal terminal. A first electrode of the fourth transistor is connected with the data signal terminal. A second electrode of the fourth transistor is connected with the second node.

In an exemplary embodiment, the second emitting control sub-circuit includes a fifth transistor. The first emitting control sub-circuit includes a sixth transistor. A control electrode of the fifth transistor is connected with the second emitting control signal terminal. A first electrode of the fifth transistor is connected with the first voltage terminal. A second electrode of the fifth transistor is connected with the second node. A control electrode of the sixth transistor is connected with the first emitting control signal terminal. A first electrode of the sixth transistor is connected with the third node. A second electrode of the sixth transistor is connected with the fourth node.

In an exemplary embodiment, the first reset sub-circuit includes a first transistor and a seventh transistor. The compensation sub-circuit includes a second transistor and a first capacitor. The driving sub-circuit includes a third transistor. The writing sub-circuit includes a fourth transistor. The second emitting control sub-circuit includes a fifth transistor. The first emitting control sub-circuit includes a sixth transistor. A control electrode of the first transistor is connected with the first scanning signal terminal. A first electrode of the first transistor is connected with the first initial signal terminal. A second electrode of the first transistor is connected with a first electrode of the seventh transistor. A control electrode of the seventh transistor is connected with the first emitting control signal terminal. A second electrode of the seventh transistor is connected with the third node. A control electrode of the second transistor is connected with the third scanning signal terminal. A first electrode of the second transistor is connected with the third node. A second electrode of the second transistor is connected with the first node. One terminal of the first capacitor is connected with the first node, and the other terminal of the first capacitor is connected with the first voltage terminal. A control electrode of the third transistor is connected with the first node. A first electrode of the third transistor is connected with the second node. A second electrode of the third transistor is connected with the third node. A control electrode of the fourth transistor is connected with the second scanning signal terminal. A first electrode of the fourth transistor is connected with the data signal terminal. A second electrode of the fourth transistor is connected with the second node. A control electrode of the fifth transistor is connected with the second emitting control signal terminal. A first electrode of the fifth transistor is connected with the first voltage terminal. A second electrode of the fifth transistor is connected with the second node. A control electrode of the sixth transistor is connected with the first emitting control signal terminal. A first electrode of the sixth transistor is connected with the third node. A second electrode of the sixth transistor is connected with the fourth node.

In an exemplary embodiment, all the first transistor to the seventh transistor are Low Temperature Poly Silicon (LTPS) Thin Film Transistors (TFTs). The signal of the third scanning signal terminal is the same as that of the first scanning signal terminal.

In an exemplary embodiment, all of the first transistor, and the third transistor to the seventh transistor are low temperature poly silicon thin film transistors. The second transistor is an Indium Gallium Zinc Oxide (IGZO) thin film transistor. The signal of the third scanning signal terminal is opposite to that of the first scanning signal terminal.

In an exemplary embodiment, the pixel circuit further includes a second reset sub-circuit. The second reset sub-circuit is connected with the second scanning signal terminal, a second initial signal terminal, and the fourth node respectively, and is configured to write a signal of the second initial signal terminal into the fourth node under the control of the signal of the second scanning signal terminal.

In an exemplary embodiment, the second reset sub-circuit includes an eighth transistor. A control electrode of the eighth transistor is connected with the second scanning signal terminal. A first electrode of the eighth transistor is connected with the second initial signal terminal. A second electrode of the eighth transistor is connected with the fourth node.

In an exemplary embodiment, the pixel circuit further includes a third reset sub-circuit. The third reset sub-circuit is connected with the second scanning signal terminal, the second voltage terminal, and the fourth node respectively, and is configured to write a signal of the second voltage terminal into the fourth node under the control of the signal of the second scanning signal terminal.

In an exemplary embodiment, the third reset sub-circuit includes a ninth transistor. A control electrode of the ninth transistor is connected with the second scanning signal terminal. A first electrode of the ninth transistor is connected with the second voltage terminal. A second electrode of the ninth transistor is connected with the fourth node.

An exemplary embodiment of the present disclosure also provides a display apparatus, which includes any abovementioned pixel circuit.

An exemplary embodiment of the present disclosure also provides a driving method for a pixel circuit, which is used for driving any abovementioned pixel circuit and includes the following operations.

In a reset stage, a first reset sub-circuit writes a signal of a first initial voltage terminal into a third node under the control of signals of a first scanning signal terminal and a first emitting control signal terminal, a compensation sub-circuit writes a signal of the third node into a first node under the control of a signal of a third scanning signal terminal, and a first emitting control sub-circuit provides the signal of the third node for a fourth node under the control of the signal of the first emitting control signal terminal.

In a data writing stage, a writing sub-circuit writes a signal of a data signal terminal into a second node under the control of a signal of a second scanning signal terminal, and the compensation sub-circuit compensates the first node under the control of the signal of the third scanning signal terminal and a signal of a first voltage terminal.

In a light emitting stage, a second emitting control sub-circuit provides the signal of the first voltage terminal for the second node under the control of the signal of the second emitting control signal terminal, a driving sub-circuit provides a driving current for the third node under the control of signals of the first node and the second node, and the first emitting control sub-circuit allows the driving current to flow between the fourth node and the third node under the control of the signal of the first emitting control signal terminal.

In an exemplary embodiment, the driving method further includes the following operation between the data writing stage and the light emitting stage.

In one or more blank stages, at least one of the first emitting control sub-circuit and the second emitting control sub-circuit forbids the driving current to flow through, wherein the one or more blank stages is used for enabling pulse widths of the signals of the first scanning signal terminal, the second scanning signal terminal, and the third scanning signal terminal in a scanning period to be same.

After the drawings and the detailed descriptions are read and understood, the other aspects may be comprehended.

BRIEF DESCRIPTION OF THE DRAWINGS

The drawings provide a further understanding to the technical solution of the present disclosure, form a part of the specification, and are adopted to explain, together with the embodiments of the present disclosure, the technical solutions of the present disclosure and not intended to form limits to the technical solutions of the present disclosure. The shapes and sizes of each component in the drawings do not reflect the true scale, and are only intended to schematically describe the contents of the present disclosure.

DETAILED DESCRIPTION

Figure 1:
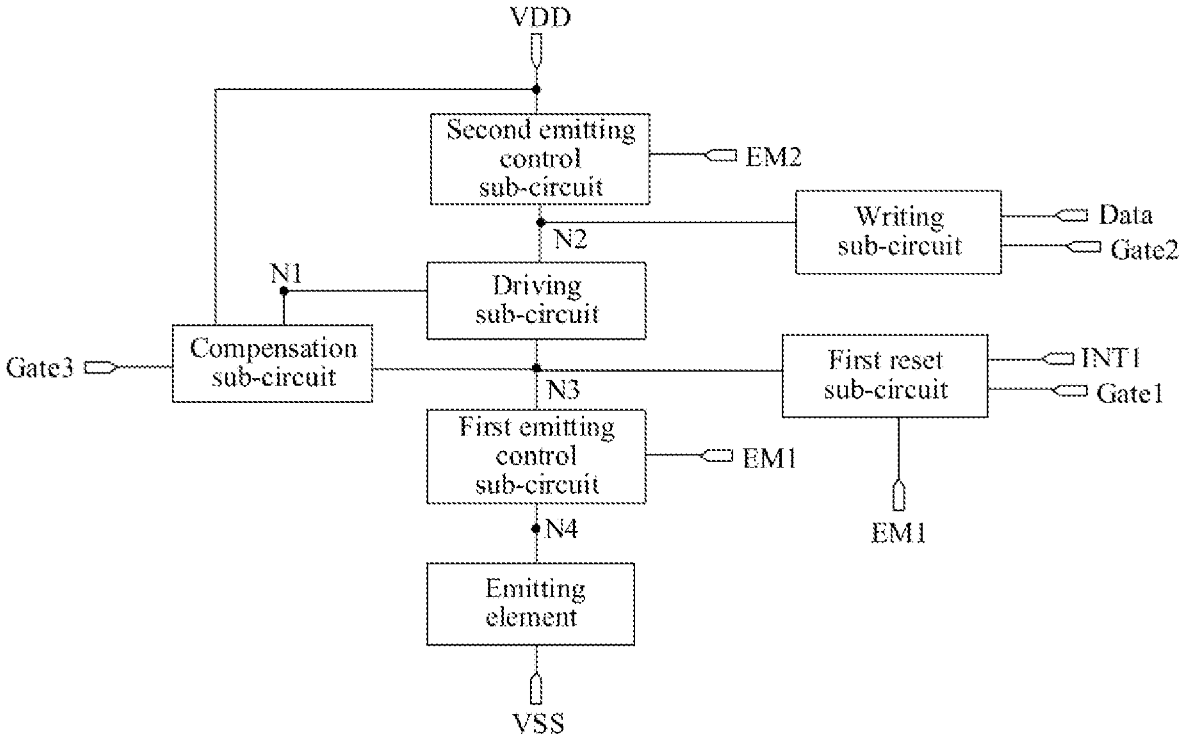
FIG. 1 is a first schematic diagram of a structure of a pixel circuit according to an embodiment of the present disclosure.

The embodiments of the present disclosure will be described below in combination with the drawings in detail. It is to be noted that implementations may be implemented in various forms. Those of ordinary skill in the art can easily understand such a fact that manners and contents may be transformed into various forms without departing from the purpose and scope of the present disclosure. Therefore, the present disclosure should not be explained as being limited to the contents recorded in the following implementations only. The embodiments in the present disclosure and the features in the embodiments can be freely combined without conflicts.

Unless otherwise defined, technical terms or scientific terms used in the embodiments of the present disclosure should have the same meanings as commonly understood by those of ordinary skill in the art that the present disclosure belongs to. "First", "second", and similar terms used in the embodiments of the present disclosure do not represent any sequence, number, or significance but are only adopted to distinguish different components. "Include", "contain", or a similar term means that an element or object appearing before the term covers an element or object and equivalent thereof listed after the term and does not exclude other elements or objects.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the present specification, the channel region refers to a main region that the current flows through.

In the present specification, the first electrode may be the drain electrode, and the second electrode may be the source electrode. Alternatively, the first electrode may be the source electrode, and the second electrode may be the drain electrode. In cases that transistors with opposite polarities are used, or a current direction changes during work of a circuit, or the like, functions of the "source electrode" and the "drain electrode" may sometimes be exchanged. Therefore, the "source electrode" and the "drain electrode" may be exchanged in the present specification.

In the present specification, "connection" includes connection of composition elements through an element with a certain electric action. "The element with the certain electric action" is not particularly limited as long as electric signals between the connected composition elements may be sent and received. Examples of "the element with the certain electric action" not only include an electrode and wire, but also include a switch element (such as a transistor), a resistor, an inductor, a capacitor, other elements with various functions, etc.

An embodiment of the present disclosure provides a pixel circuit. FIG. 1 is a schematic diagram of a structure of a pixel circuit according to an embodiment of the present disclosure. As shown in FIG. 1, the pixel circuit includes a driving sub-circuit, a writing sub-circuit, a compensation sub-circuit, a first reset sub-circuit, a first emitting control sub-circuit, a second emitting control sub-circuit, and an emitting element.

The driving sub-circuit is connected with a first node N1, a second node N2, and a third node N3 respectively, and is configured to provide a driving current for the third node N3 under control of signals of the first node N1 and the second node N2.

The writing sub-circuit is connected with a second scanning signal terminal Gate2, a data signal terminal Data, and the second node N2 respectively, and is configured to write a signal of the data signal terminal Data into the second node N2 under control of a signal of the second scanning signal terminal Gate2.

The compensation sub-circuit is connected with a first voltage terminal VDD, a third scanning signal terminal Gate3, the first node N1, and the third node N3 respectively, and is configured to write a signal of the third node N3 into the first node N1 under control of a signal of the third scanning signal terminal Gate3 and compensate the first node N1 under control of the signal of the third scanning signal terminal Gate3 and a signal of the first voltage terminal VDD.

The first reset sub-circuit is connected with a first scanning signal terminal Gate1, a first emitting control signal terminal EM1, a first initial signal terminal INT1, and the third node N3 respectively, and is configured to write a signal of the first initial signal terminal INT1 into the third node N3 under control of signals of the first scanning signal terminal Gate1 and the first emitting control signal terminal EM1.

The second emitting control sub-circuit is connected with the first voltage terminal VDD, a second emitting control signal terminal EM2, and the second node N2 respectively, and is configured to provide the signal of the first voltage terminal VDD for the second node N2 under control of a signal of the second emitting control signal terminal EM2.

The first emitting control sub-circuit is connected with the first emitting control signal terminal EM1, the third node N3, and a fourth node respectively, and is configured to provide the signal of the third node N3 for the fourth node under control of the signal of the first emitting control signal terminal EM1, and allow a driving current to flow between the third node and the fourth node.

One terminal of the emitting element is connected with the fourth node N4, while the other terminal is connected with a second voltage terminal VSS.

According to the pixel circuit provided in the embodiment of the present disclosure, the writing sub-circuit writes the signal of the data signal terminal Data into the second node N2 under the control of the signal of the second scanning signal terminal Gate2; the compensation sub-circuit writes the signal of the third node N3 into the first node N1 under the control of the signal of the third scanning signal terminal Gate3, and compensates the first node N1 under the control of the signal of the third scanning signal terminal Gate3 and the signal of the first voltage terminal VDD; the first reset sub-circuit writes the signal of the first initial signal terminal INT1 into the third node N3 under the control of the signals of the first scanning signal terminal Gate1 and the first emitting control signal terminal EM1; the first emitting control sub-circuit provides the signal of the third node N3 for the fourth node N4 under the control of the signal of the first emitting control signal terminal EM1. As such, the compensation for a voltage of a control electrode of the driving sub-circuit is implemented, the influence of a threshold voltage drift of the driving sub-circuit on the driving current of the emitting element is avoided, and the uniformity of a display image and the display quality of a display panel are improved. In addition, the pixel circuit of the embodiment of the present disclosure has fewer leakage channels, so that the low-frequency flicker effect is improved. Moreover, the pixel circuit of the embodiment of the present disclosure does not need a double-gate design, so that the space occupied by the pixel circuit is reduced, and the screen resolution is improved.

Figure 2:
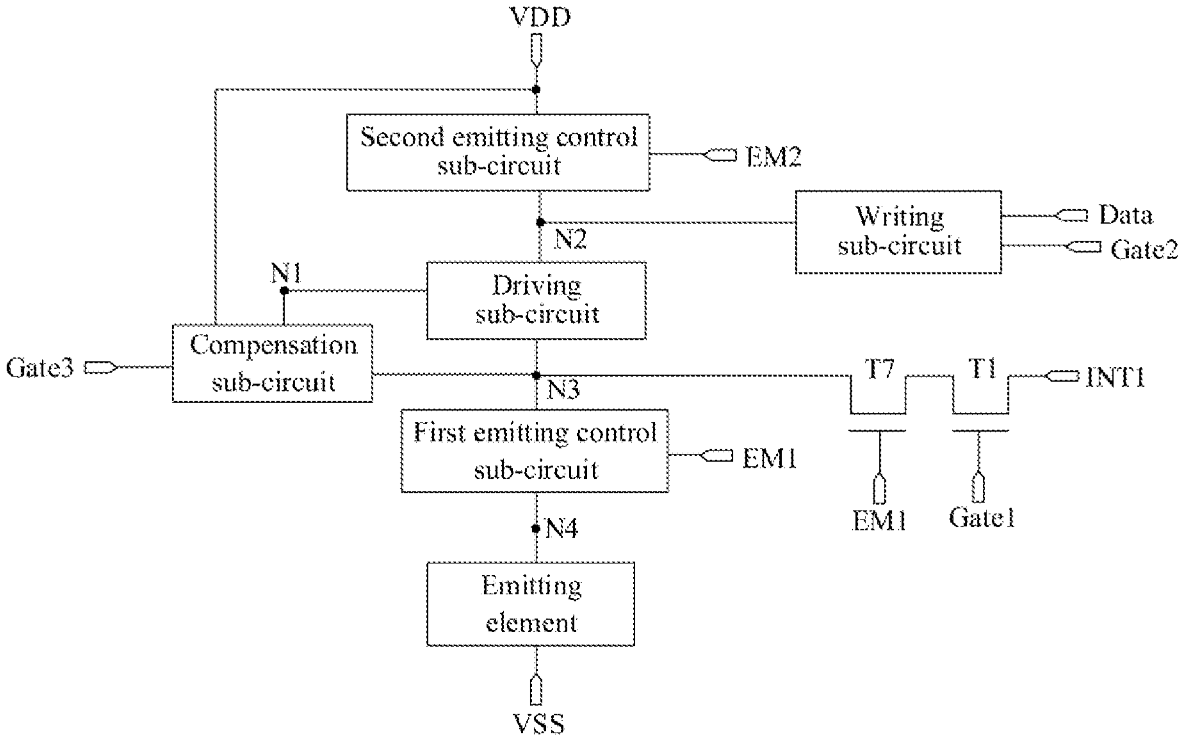
FIG. 2 is an equivalent circuit diagram of a first reset sub-circuit according to an embodiment of the present disclosure.

In an exemplary embodiment, FIG. 2 is an equivalent circuit diagram of a first reset sub-circuit according to an embodiment of the present disclosure. As shown in FIG. 2, the first reset sub-circuit provided in the embodiment of the present disclosure includes a first transistor T1 and a seventh transistor T7.

A control electrode of the first transistor T1 is connected with the first scanning signal terminal Gate1. A first electrode of the first transistor T1 is connected with the first initial signal terminal INT1. A second electrode of the first transistor T1 is connected with a first electrode of the seventh transistor T7.

A control electrode of the seventh transistor T7 is connected with the first emitting control signal terminal EM1. A second electrode of the seventh transistor T7 is connected with the third node N3.

FIG. 2 shows an exemplary structure of the first reset sub-circuit. It is easy for those skilled in the art to understand that an implementation of the first reset sub-circuit is not limited thereto as long as a function thereof can be realized.

Figure 3:
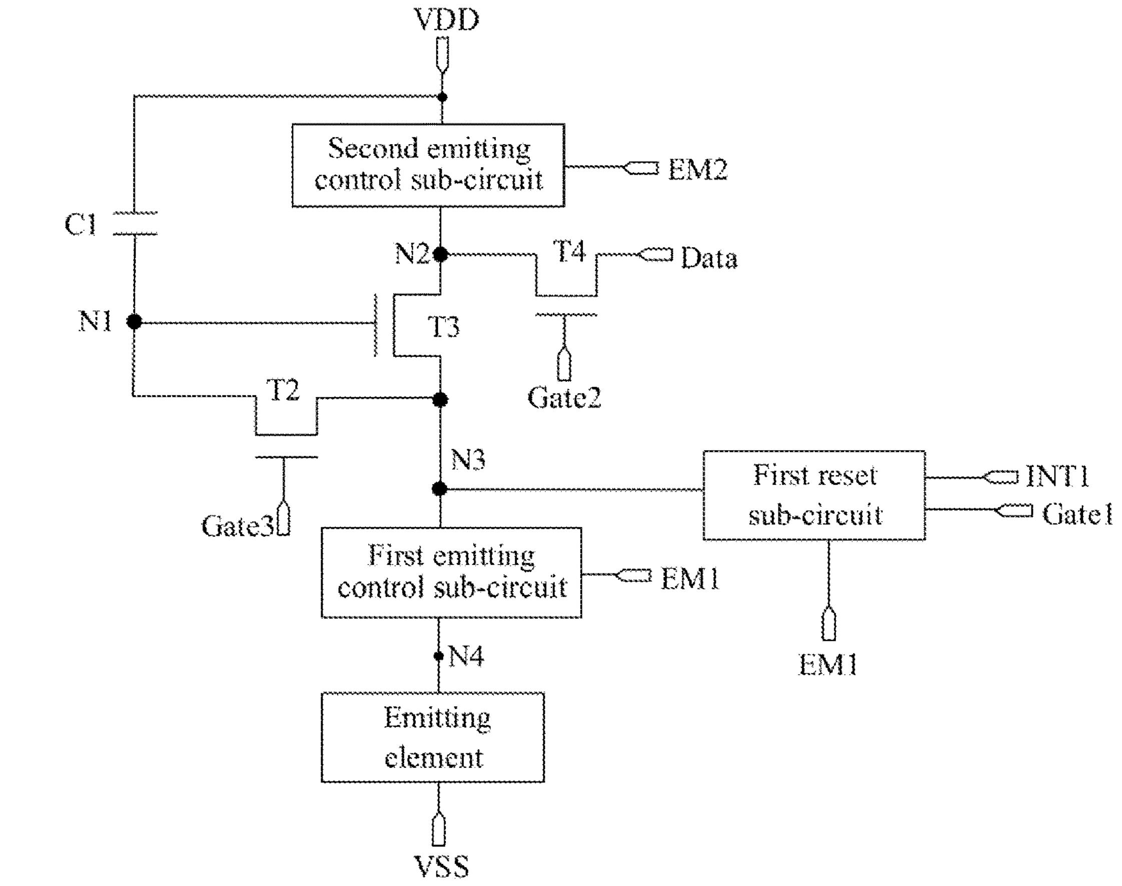
FIG. 3 is an equivalent circuit diagram of a compensation sub-circuit, a driving sub-circuit, and a writing sub-circuit according to an embodiment of the present disclosure.

In an exemplary embodiment, FIG. 3 is an equivalent circuit diagram of a compensation sub-circuit, a driving sub-circuit, and a writing sub-circuit according to an embodiment of the present disclosure. As shown in FIG. 3, the compensation sub-circuit provided in the embodiment of the present disclosure includes a second transistor T2 and a first capacitor C1, the driving sub-circuit includes a third transistor (i.e., driving transistor) T3, and the writing sub-circuit includes a fourth transistor T4.

A control electrode of the second transistor T2 is connected with the third scanning signal terminal Gate3. A first electrode of the second transistor T2 is connected with the third node N3. A second electrode of the second transistor T2 is connected with the first node N1.

One terminal of the first capacitor C1 is connected with the first node N1, and the other terminal of the first capacitor C1 is connected with the first voltage terminal VDD.

A control electrode of the third transistor T3 is connected with the first node N1. A first electrode of the third transistor T3 is connected with the second node N2. A second electrode of the third transistor T3 is connected with the third node N3.

A control electrode of the fourth transistor T4 is connected with the second scanning signal terminal Gate2. A first electrode of the fourth transistor T4 is connected with the data signal terminal Data. A second electrode of the fourth transistor T4 is connected with the second node N2.

FIG. 3 shows exemplary structures of the compensation sub-circuit, the driving sub-circuit, and the writing sub-circuit. It is easy for those skilled in the art to understand that implementations of the compensation sub-circuit, the driving sub-circuit, and the writing sub-circuit is not limited thereto as long as functions thereof can be realized.

Figure 4:
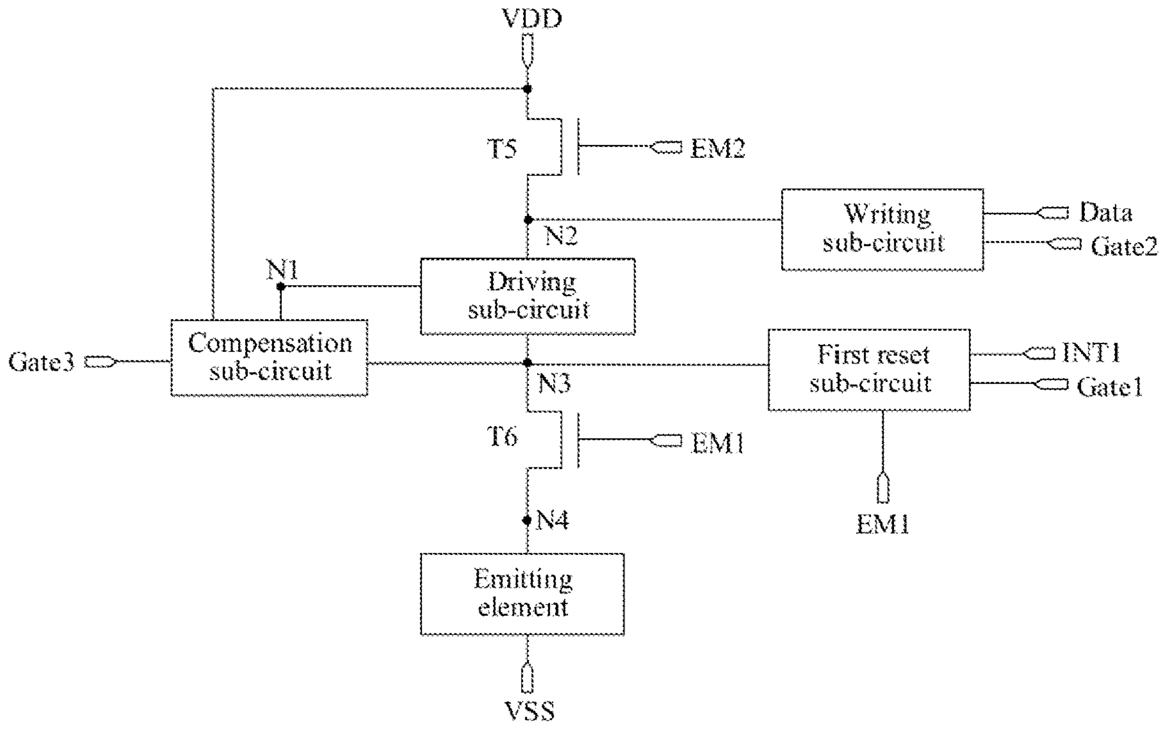
FIG. 4 is an equivalent circuit diagram of a second emitting control sub-circuit and a first emitting control sub-circuit according to an embodiment of the present disclosure.

In an exemplary embodiment, FIG. 4 is an equivalent circuit diagram of a second emitting control sub-circuit and a first emitting control sub-circuit according to an embodiment of the present disclosure. As shown in FIG. 4, the second emitting control sub-circuit provided in the embodiment of the present disclosure includes a fifth transistor T5, and the first emitting control sub-circuit includes a sixth transistor T6.

A control electrode of the fifth transistor T5 is connected with the second emitting control signal terminal EM2. A first electrode of the fifth transistor T5 is connected with the first voltage terminal VDD. A second electrode of the fifth transistor T5 is connected with the second node N2.

A control electrode of the sixth transistor T6 is connected with the first emitting control signal terminal EM1. A first electrode of the sixth transistor T6 is connected with the third node N3. A second electrode of the sixth transistor T6 is connected with the fourth node N4.

FIG. 4 shows exemplary structures of the second emitting control sub-circuit and the first emitting control sub-circuit. It is easy for those skilled in the art to understand that implementations of the second emitting control sub-circuit and the first emitting control sub-circuit are not limited thereto as long as functions thereof can be realized.

Figure 5:
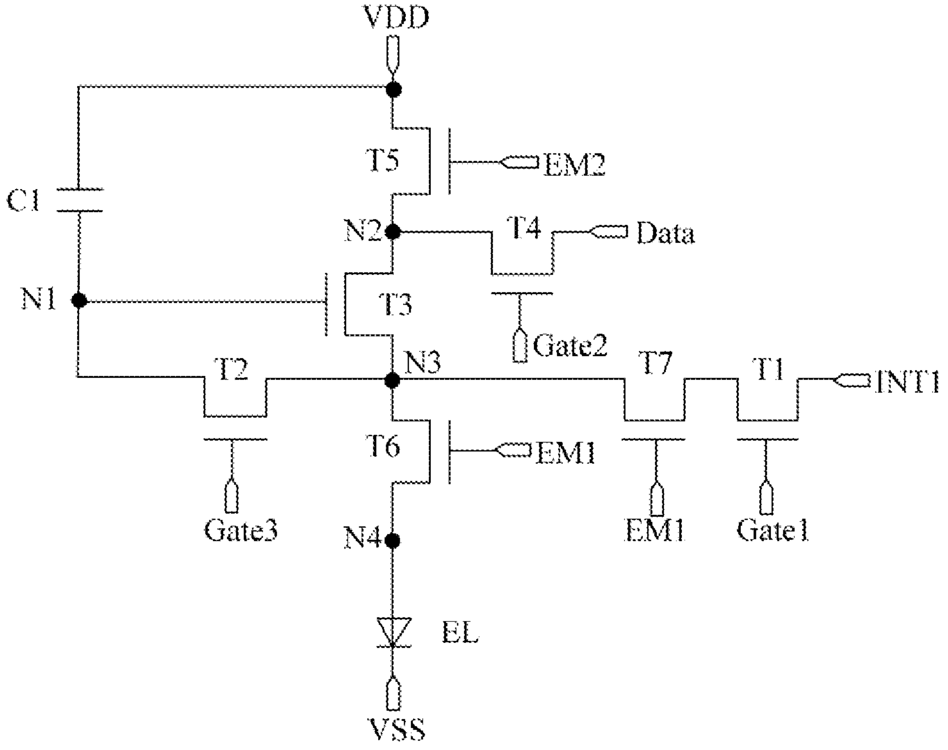
FIG. 5 is a first equivalent circuit diagram of a pixel circuit according to an embodiment of the present disclosure.
Figure 6:
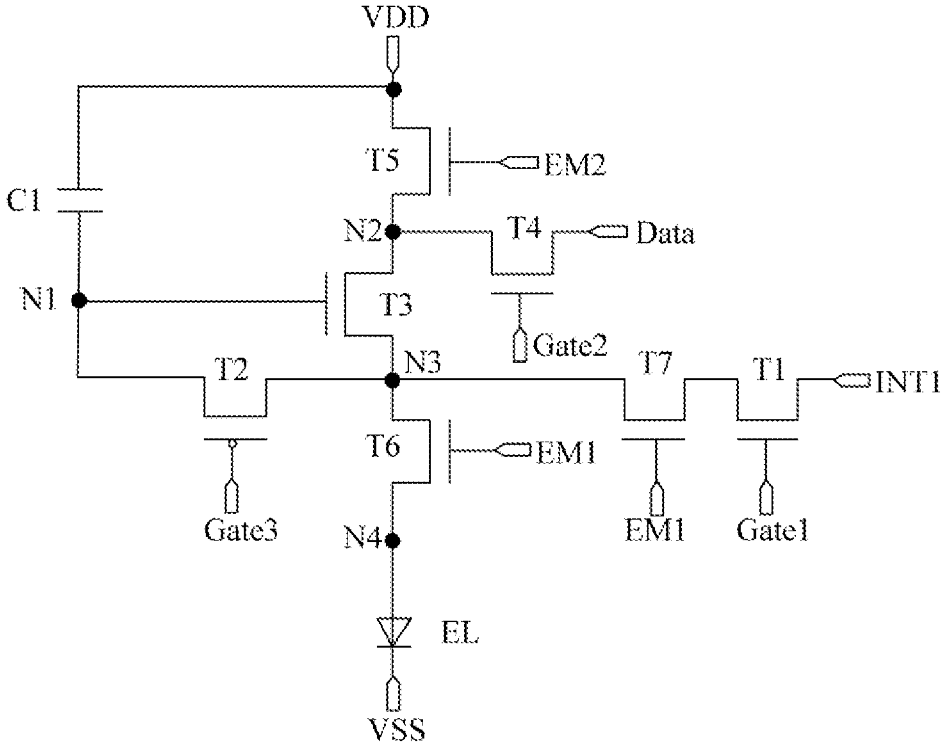
FIG. 6 is a second equivalent circuit diagram of a pixel circuit according to an embodiment of the present disclosure.

FIGS. 5 and 6 are two equivalent circuit diagrams of a pixel circuit according to an embodiment of the present disclosure. As shown in FIGS. 5 and 6, in the pixel circuit provided in the embodiment of the present disclosure, the first reset sub-circuit includes a first transistor T1 and a seventh transistor T7, the compensation sub-circuit includes a second transistor T2 and a first capacitor C1, the driving sub-circuit includes a third transistor T3, the writing sub-circuit includes a fourth transistor T4, the second emitting control sub-circuit includes a fifth transistor T5, and the first emitting control sub-circuit includes a sixth transistor T6.

A control electrode of the first transistor T1 is connected with the first scanning signal terminal Gate1. A first electrode of the first transistor T1 is connected with the first initial signal terminal INT1. A second electrode of the first transistor T1 is connected with a first electrode of the seventh transistor T7.

A control electrode of the seventh transistor T7 is connected with the first emitting control signal terminal EM1. A second electrode of the seventh transistor T7 is connected with the third node N3.

A control electrode of the second transistor T2 is connected with the third scanning signal terminal Gate3. A first electrode of the second transistor T2 is connected with the third node N3. A second electrode of the second transistor T2 is connected with the first node N1.

One terminal of the first capacitor C1 is connected with the first node N1, and the other terminal of the first capacitor C1 is connected with the first voltage terminal VDD.

A control electrode of the third transistor T3 is connected with the first node N1. A first electrode of the third transistor T3 is connected with the second node N2. A second electrode of the third transistor T3 is connected with the third node N3.

A control electrode of the fourth transistor T4 is connected with the second scanning signal terminal Gate2. A first electrode of the fourth transistor T4 is connected with the data signal terminal Data. A second electrode of the fourth transistor T4 is connected with the second node N2.

A control electrode of the fifth transistor T5 is connected with the second emitting control signal terminal EM2. A first electrode of the fifth transistor T5 is connected with the first voltage terminal VDD. A second electrode of the fifth transistor T5 is connected with the second node N2.

A control electrode of the sixth transistor T6 is connected with the first emitting control signal terminal EM1. A first electrode of the sixth transistor T6 is connected with the third node N3. A second electrode of the sixth transistor T6 is connected with the fourth node N4.

FIGS. 5 and 6 show exemplary structures of the first reset sub-circuit, the compensation sub-circuit, the driving sub-circuit, the writing sub-circuit, the second emitting control sub-circuit, and the first emitting control sub-circuit. It is easy for those skilled in the art to understand that implementations of the above sub-circuits are not limited thereto as long as functions thereof may can realized.

In an exemplary embodiment, the emitting element EL may be an Organic Light Emitting Diode (OLED) or a light emitting diode of any other type.

Figure 7:
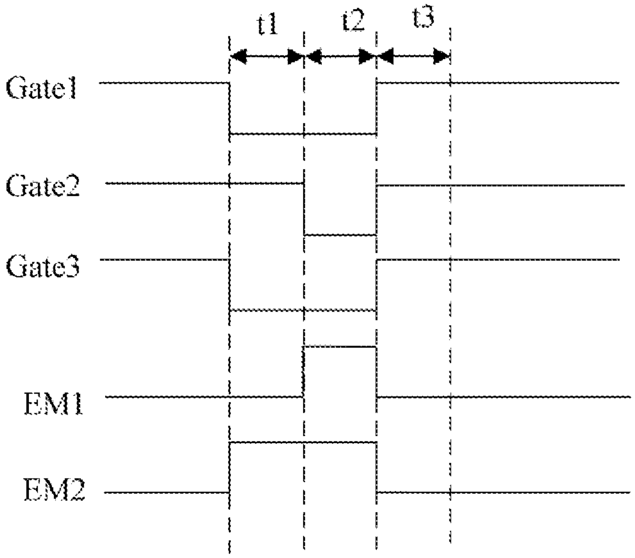
FIG. 7 is a first working timing diagram of a pixel circuit according to an embodiment of the present disclosure.

In an exemplary embodiment, as shown in FIGS. 5 and 7, all of the first transistor to the seventh transistor are N-type thin film transistors or P-type thin film transistors. A signal of the third scanning signal terminal Gate3 is the same as that of the first scanning signal terminal Gate1.

When all of the first transistor T1 to the seventh transistor T7 are thin film transistors of the same type, since the signals of the third scanning signal terminal Gate3 and the first scanning signal terminal Gate1 are totally the same, the third scanning signal terminal Gate3 and the first scanning signal terminal Gate1 may be connected to the same scanning signal line.

In an exemplary embodiment, the first transistor T1 to the seventh transistor T7 may be P-type transistors or N-type transistors. Adopting the same type of transistors in the pixel circuit may simplify the process flow, reduce the process difficulties of the display panel, and improve the yield of the product. In some possible implementations, the first transistor T1 to the seventh transistor T7 may include P-type transistors and N-type transistors.

Compared with a conventional pixel circuit, the pixel circuit of the embodiment of the present disclosure has only one leakage channel (i.e., the second transistor T2 connected with the control electrode of the third transistor T3), and the generated leakage current is reduced as leakage channels is reduced, a luminance difference of a frame of image is reduced and a better low-frequency flicker effect is achieved. In addition, compared with the conventional pixel circuit, the first transistor T1 according to the embodiment of the present disclosure is not connected with the control electrode of the third transistor T3, and no leakage current may be generated, so that the first transistor T1 does not need a double-gate design, the space occupied by the pixel circuit is reduced, facilitating improvement of the resolution of the display panel.

Figure 8:
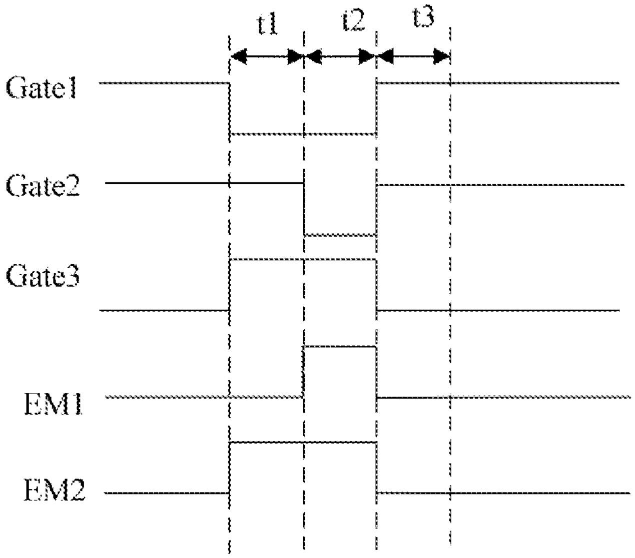
FIG. 8 is a second working timing diagram of a pixel circuit according to an embodiment of the present disclosure.

In another exemplary embodiment, as shown in FIGS. 6 and 8, all of the first transistor T1, and the third transistor T3 to the seventh transistor T7 are P-type thin film transistors. The second transistor T2 is an N-type thin film transistor. A signal of the third scanning signal terminal Gate3 is opposite to that of the first scanning signal terminal Gate1.

In an exemplary embodiment, all off the first transistor T1, and the third transistor T3 to the seventh transistor T7 are Low Temperature Poly Silicon (LTPS) Thin Film Transistors (TFTs), and the second transistor T2 is an Indium Gallium Zinc Oxide (IGZO) thin film transistor.

In the present embodiment, the indium gallium zinc oxide thin film transistor generates a lower leakage current than the low temperature poly silicon thin film transistor, so that arranging the second transistor T2 to be the indium gallium zinc oxide thin film transistor may significantly reduce the generated leakage current. There is no need of arranging the first transistor T1 to be the indium gallium zinc oxide thin film transistor because the size of the low temperature poly silicon thin film transistor is usually smaller than that of the indium gallium zinc oxide thin film transistor. Therefore, the pixel circuit of the embodiment of the present disclosure may usually occupy a relatively small space, which helps to improve the resolution of the display panel.

A working process of a pixel circuit unit in a period of a frame will be described below in combination with the pixel circuit unit shown in FIG. 5 and the working timing diagram shown in FIG. 7 by taking all of the first transistor T1 to the seventh transistor T7 in the pixel circuit provided in the embodiment of the present disclosure being P-type thin-film transistors as an example. As shown in FIG. 5, the pixel circuit provided in the embodiment of the present disclosure includes seven transistor units (T1 to T7), a capacitor unit (C1), and four power terminals (VDD, VSS, Data, and INT1). A first power voltage terminal VDD keeps providing a high-level signal VGH. A second power voltage terminal VSS keeps providing a low-level signal VGL. In an exemplary implementation, the working process includes the following contents.

In a first stage t1, called a reset stage, signals of a first scanning signal terminal Gate1, a third scanning signal terminal Gate3, and a first emitting control signal terminal EM1 are all low-level signals, and signals of a second scanning signal terminal Gate2 and a second emitting control signal terminal EM2 are both high-level signals. The low-level signals of the first scanning signal terminal Gate1, the third scanning signal terminal Gate3, and the first emitting control signal terminal EM1 turn on a first transistor T1, a second transistor T2, a sixth transistor T6, and a seventh transistor T7. The first transistor T1 and the seventh transistor T7 are turned on, so that an initial voltage Vint1 of a first initial signal terminal INT1 is provided for a third node N3. The second transistor T2 is turned on, so that an initial voltage Vint1 of the third node N3 is provided for a first node N1. The sixth transistor T6 is turned on, so that the initial voltage Vint1 of the third node N3 is provided for a fourth node N4. In such case, potentials of the first node N1, the third node N3, and the fourth node N4 are all the initial voltage Vint1 provided by the first initial signal terminal INT1. In the stage, a storage capacitor C1, an anode-terminal voltage of an emitting element EL, and a gate voltage of a third transistor (i.e., a driving transistor) T3 are reset to complete initialization. The high-level signals of the second scanning signal terminal Gate2 and the second emitting control signal terminal EM2 turn off a fourth transistor T4 and a fifth transistor T5. In the stage, the OLED does not emit light.

In a second stage t2, called a data writing stage, the signals of the first scanning signal terminal Gate1, the second scanning signal terminal Gate2, the third scanning signal terminal Gate3 are all low-level signals, and the signals of the first emitting control signal terminal EM1 and the second emitting control signal terminal EM2 are both high-level signals, and a data signal terminal Data outputs a data voltage. In the stage, a second terminal (i.e., the first node N1) of the first capacitor C1 is a low level, so that the third transistor T3 is turned on. The low-level signals of the first scanning signal terminal Gate1, the second scanning signal terminal Gate2, and the third scanning signal terminal Gate3 turn on the first transistor T1, the second transistor T2, and the fourth transistor T4. The second transistor T2 and the fourth transistor T4 are turned on, so that the data voltage output by the data signal terminal Data is provided for the first node N1 through the second node N2, the turned-on third transistor T3, the third node N3, and the turned-on second transistor T2, and the first capacitor C1 is charged with a difference between the data voltage output by the data signal terminal Data and a threshold voltage of the third transistor T3. A voltage of the second terminal (the first node N1) of the first capacitor C1 is Vata-Vth, where Vdata is the data voltage output by the data signal terminal Data, and Vth is the threshold voltage of the third transistor T3. The high-level signals of the first emitting control signal terminal EM1 and the second emitting control signal terminal EM2 turn off the fifth transistor T5 and the sixth transistor T6 to ensure that the OLED does not emit light.

In a third stage t3, called a light emitting stage, the signals of the first emitting control signal terminal EM1 and the second emitting control signal terminal EM2 are both low-level signals, and the signals of the first scanning signal terminal Gate1, the second scanning signal terminal Gate2, and the third scanning signal terminal Gate3 are all high-level signals. The low-level signals of the first emitting control signal terminal EM1 and the second emitting control signal terminal EM2 turn on the fifth transistor T5 and the sixth transistor T6, and a power supply voltage output by the first power terminal VDD provides a driving voltage for a first electrode (i.e., the fourth node N4) of the emitting element EL through the turned-on fifth transistor T5, third transistor T3, and sixth transistor T6 to drive the emitting element EL to emit light.

In a driving process of the pixel circuit, a driving current flowing through the third transistor T3 (i.e., the driving transistor) is determined by a voltage difference between a gate electrode and first electrode thereof. Since the voltage of the first node N1 is Vdata-Vth, the driving current of the third transistor T3 is:

$$I=K^*(Vgs-Vth)^2=K^*[(Vdd-V\text{data}+Vth)-Vth]^2=K^*[(Vdd-Vd)]^2.$$

I is the driving current flowing through the third transistor T3, i.e., the driving current for driving the emitting element EL. K is a constant. Vgs is the voltage difference between the gate electrode and first electrode of the third transistor T3. Vth is the threshold voltage of the third transistor T3. Vdata is the data voltage output by the data signal terminal Data. Vdd is the power supply voltage output by the first power terminal VDD.

It can be seen from the abovementioned formula that the current I flowing through the emitting element EL is unrelated to the threshold voltage Vth of the third transistor T3, so that the influence of the threshold voltage Vth of the third transistor T3 on the current I is eliminated, and the uniformity of the luminance is ensured.

Based on the abovementioned working timing, the pixel circuit eliminates remaining positive charges of the emitting element EL after he emitting element EL emitted light last time, implements the compensation for the gate voltage of the driving transistor, avoids the influence of a threshold voltage drift of the driving transistor on the driving current of the emitting element EL, and improves the uniformity of a display image and the display quality of the display panel.

Figure 9:
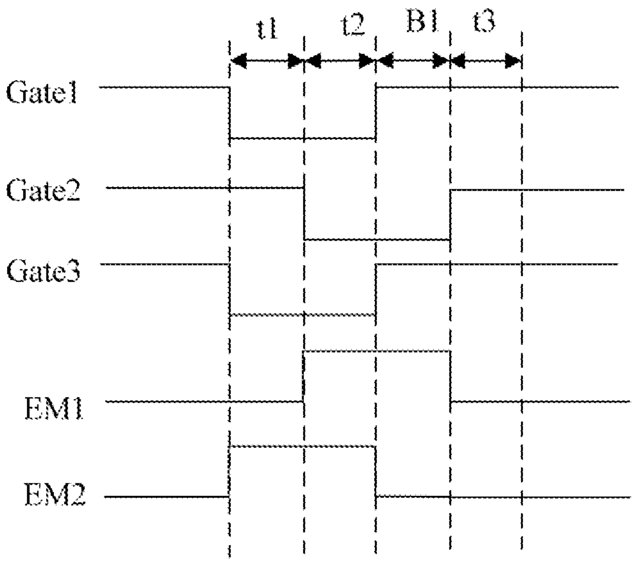
FIG. 9 is a third working timing diagram of a pixel circuit according to an embodiment of the present disclosure.
Figure 10:
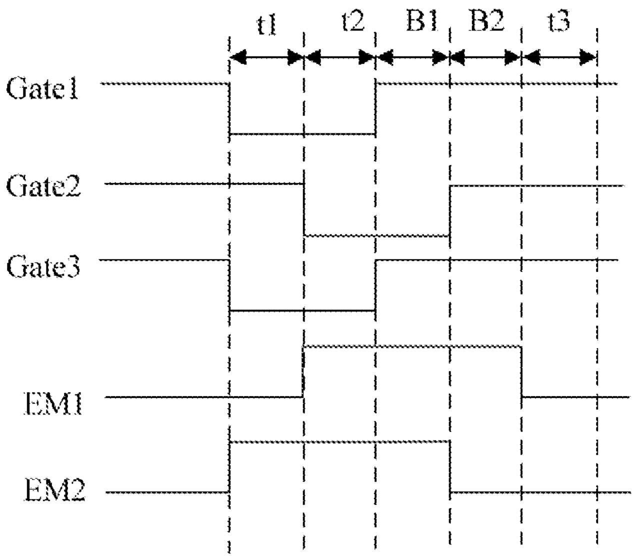
FIG. 10 is a fourth working timing diagram of a pixel circuit according to an embodiment of the present disclosure.

In some exemplary embodiments, as shown in FIGS. 9 and 10, one or more blank stages Bi may be added between the second stage t2 (the data writing stage) and the third stage t3 (the light emitting stage). Herein, i is a natural number more than or equal to 1. In the blank stage Bi, at least one of the signals of the first emitting control signal terminal EM1 and the second emitting control signal terminal EM2 is a high-level signal, so that the emitting element EL does not emit light in the blank stage Bi. According to the embodiment of the present disclosure, one or more blank stages are set to enable pulse widths of the signals of the first scanning signal terminal Gate1, the second scanning signal terminal Gate2, and the third scanning signal terminal Gate3 in a scanning period to be same, so that shift registers may be cascaded to generate the signals of the first scanning signal terminal Gate1, the second scanning signal terminal Gate2, and the third scanning signal terminal Gate3.

In an exemplary embodiment, as shown in FIGS. 9 and 10, comparison between the signal of the first scanning signal terminal Gate1 and the signal of the second scanning signal terminal Gate2 in a scanning period shows that periods of low-level pulses thereof are the same and starting times thereof are different only by a stage t1. Therefore, pixel circuits of sub-pixels of adjacent rows may share the same scanning signal line.

Figure 11:
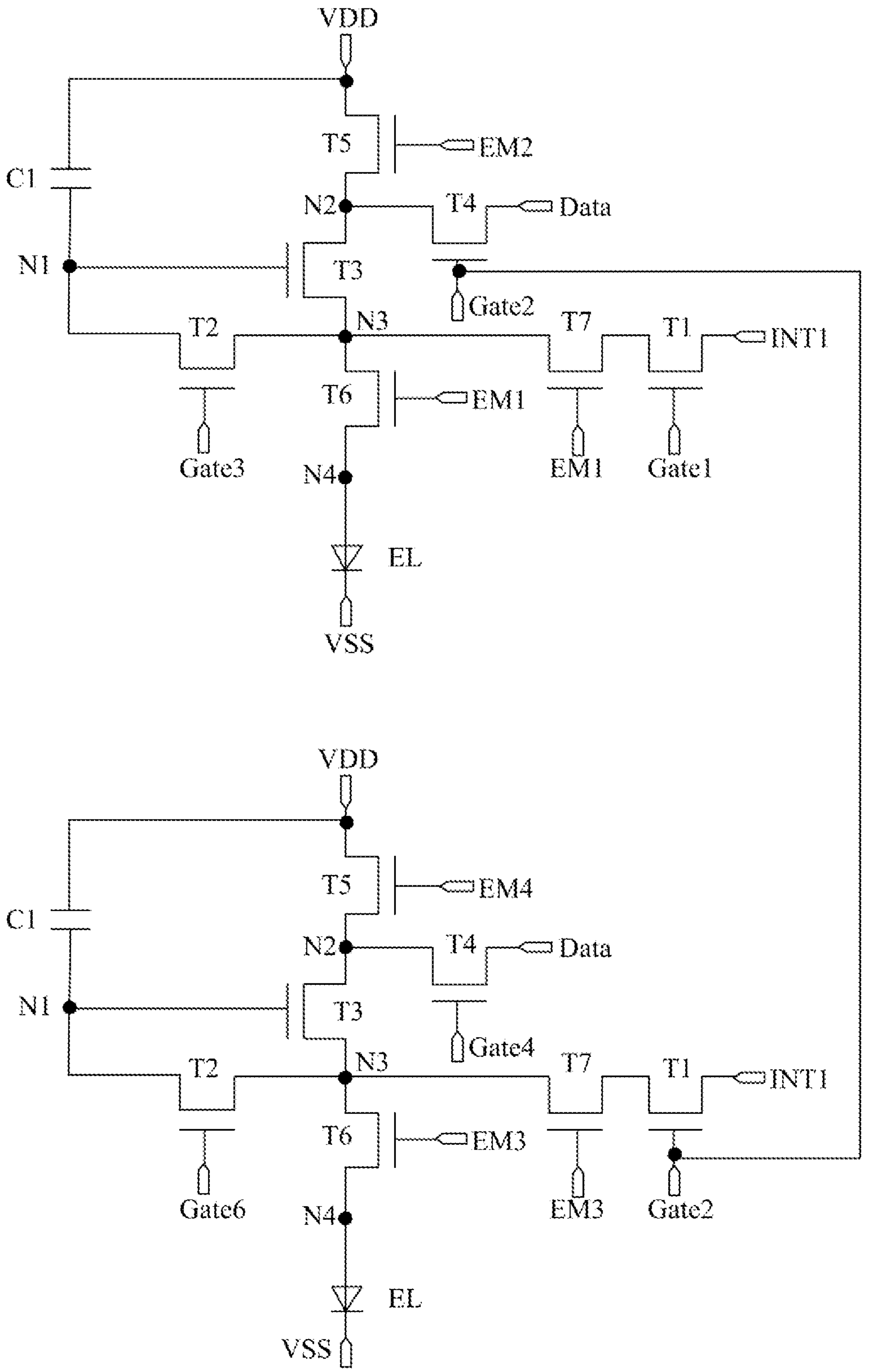
FIG. 11 is a first equivalent circuit diagram of pixel circuits of sub-pixels of two adjacent rows according to an embodiment of the present disclosure.

As shown in FIG. 11, a fourth transistor T4 in a sub-pixel of an ith row may share the same scanning signal line with a first transistor T1 in a sub-pixel of an (i+1)th row. Therefore, during pixel layout designing, both a channel region of the fourth transistor T4 in the sub-pixel of the ith row and a channel region of the first transistor T1 in the sub-pixel of the (i+1)th row may extend in a first direction and are on the same straight line. In the present embodiment, the first direction may be an extending direction of the scanning signal line.

Figure 12:
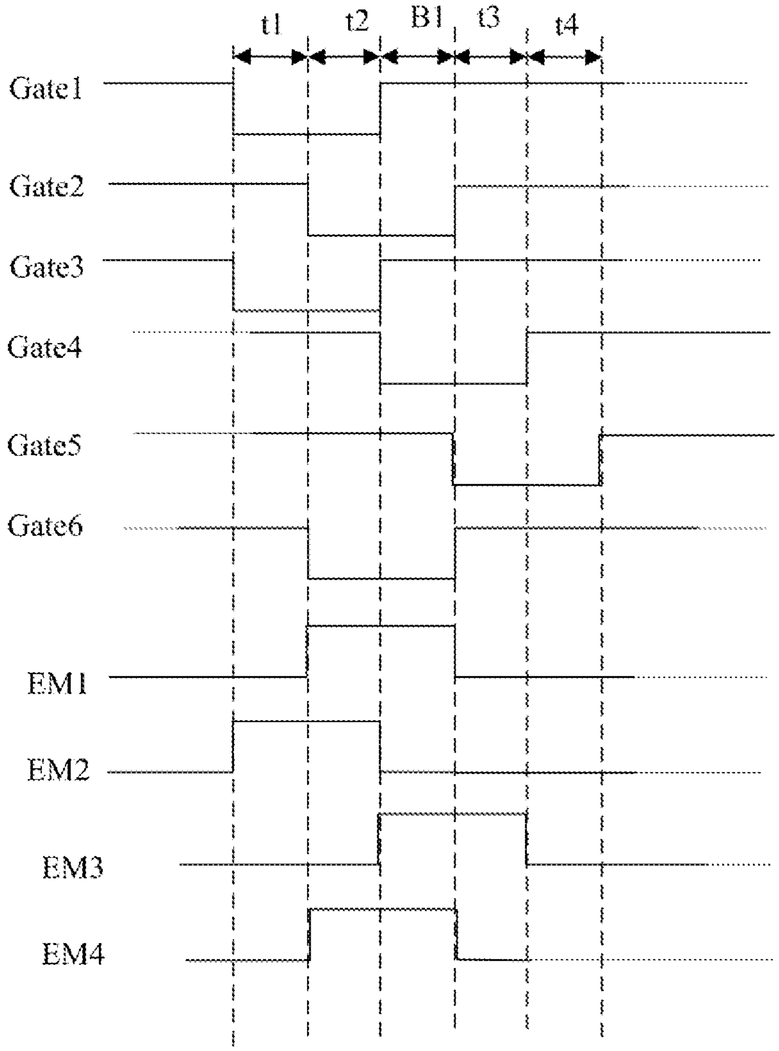
FIG. 12 is a working timing diagram of pixel circuits of sub-pixels of two adjacent rows shown in FIG. 11.

FIG. 12 is a schematic driving sequence diagram of the pixel circuit shown in FIG. 11. In an exemplary embodiment, as shown in FIG. 12, for signals of the first scanning signal terminal Gate1, the second scanning signal terminal Gate2, a fourth scanning signal terminal Gate4, a fifth scanning signal terminal Gate5, etc., in a scanning period, periods of low-level pulses are the same, and starting times thereof are sequentially different by a stage t1. Shift registers may be cascaded to generate the corresponding signals. When the first transistor T1 to the seventh transistor T7 are of the same type, the signal of the third scanning signal terminal Gate3 and the signal of the first scanning signal terminal Gate1 are the same, and a signal of a sixth scanning signal terminal Gate6 and the signal of the second scanning signal terminal Gate2 are the same. When the second transistor T2 and the other transistors are of different types, the signal of the third scanning signal terminal Gate3 and the signal of the first scanning signal terminal Gate1 are opposite, and a signal of a sixth scanning signal terminal Gate6 and the signal of the second scanning signal terminal Gate2 are opposite.

Assumed that the whole display panel includes totally 2N rows of sub-pixels, N being a natural number greater than 1, a first transistor T1 in a sub-pixel of a (2i+1)th row is connected with a signal of a (3i+1)th scanning signal terminal, a fourth transistor T4 in the sub-pixel of the (2i+1)th row is connected with a signal of a (3i+2)th scanning signal terminal, a first transistor T1 in a sub-pixel of a (2i+2)th row is connected with the signal of the (3i+3)th scanning signal terminal, and a fourth transistor T4 in the sub-pixel of the (2i+2)th row is connected with a signal of a (3i+4)th scanning signal terminal, i being an integer from 0 to N−1.

A second transistor T2 in a sub-pixel of a kth row is connected with a signal of a (3k)th scanning signal terminal, a sixth transistor T6 and seventh transistor T7 in the sub-pixel of the kth row are connected with a signal of a (2k−1)th emitting control signal terminal, and a fifth transistor T5 in the sub-pixel of the kth row is connected with a signal of a (2k)th emitting control signal terminal, k being an integer from 1 to 2N.

For the whole display panel, the signal of the first scanning signal terminal, the signal of the second scanning signal terminal, the signal of the fourth scanning signal terminal, the signal of the fifth scanning signal terminal, . . . , the signal of the (3i+1)th scanning signal terminal, the signal of the (3i+2)th scanning signal terminal, . . . , a signal of a (3N−2) scanning signal terminal, and a signal of a (3N−1)th scanning signal terminal may be generated by sequential shifting of a group of shift registers. That is, the signal of the first scanning signal terminal, the signal of the second scanning signal terminal, the signal of the fourth scanning signal terminal, the signal of the fifth scanning signal terminal, a signal of a seventh scanning signal terminal, a signal of an eighth scanning signal terminal, etc., are gradually shifted (periods of low-level pulses are all the same, and starting times are sequentially different by a stage t1).

The signal of the third scanning signal terminal, the signal of the sixth scanning signal terminal, . . . , the signal of the (3k)th scanning signal terminal, . . . , and the signal of the (3N)th scanning signal terminal may be generated by sequential shifting of a group of shift registers. Optionally, when the first transistor T1 to the seventh transistor T7 are of the same type, a control electrode of the second transistor T2 in the sub-pixel of the kth row may share the same scanning signal line with a control electrode of a first transistor T1 in the sub-pixel of the row, namely the signal of the (3k)th scanning signal terminal is a signal of the control electrode of the first transistor T1 in the sub-pixel of the present row.

The signal of the first emitting control signal terminal, a signal of a third emitting control signal terminal, . . . , the signal of the (2k−1)th emitting control signal terminal, . . . , and a signal of a (4N−1)th scanning signal terminal may be generated by sequential shifting of a group of shift registers.

The signal of the second emitting control signal terminal, a signal of a fourth emitting control signal terminal, . . . , the signal of the (2k)th emitting control signal terminal, . . . , and a signal of a (4N)th emitting control signal terminal may be generated by sequential shifting of a group of shift registers.

Figure 13:
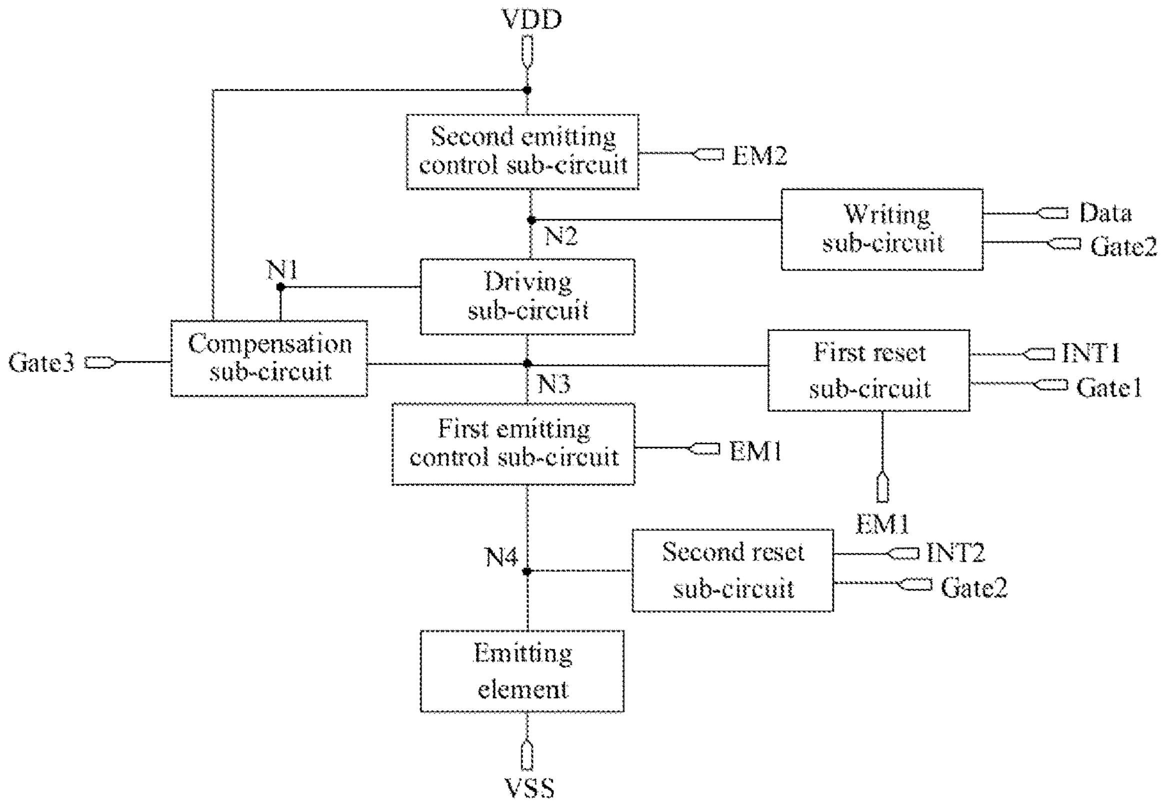
FIG. 13 is a second schematic diagram of a structure of a pixel circuit according to an embodiment of the present disclosure.

In an exemplary embodiment, as shown in FIG. 13, the pixel circuit further includes a second reset sub-circuit. The second reset sub-circuit is connected with the second scanning signal terminal Gate2, a second initial signal terminal INT2, and the fourth node N4 respectively, and is configured to write a signal of the second initial signal terminal INT2 into the fourth node N4 under the control of the signal of the second scanning signal terminal Gate2.

Figure 14:
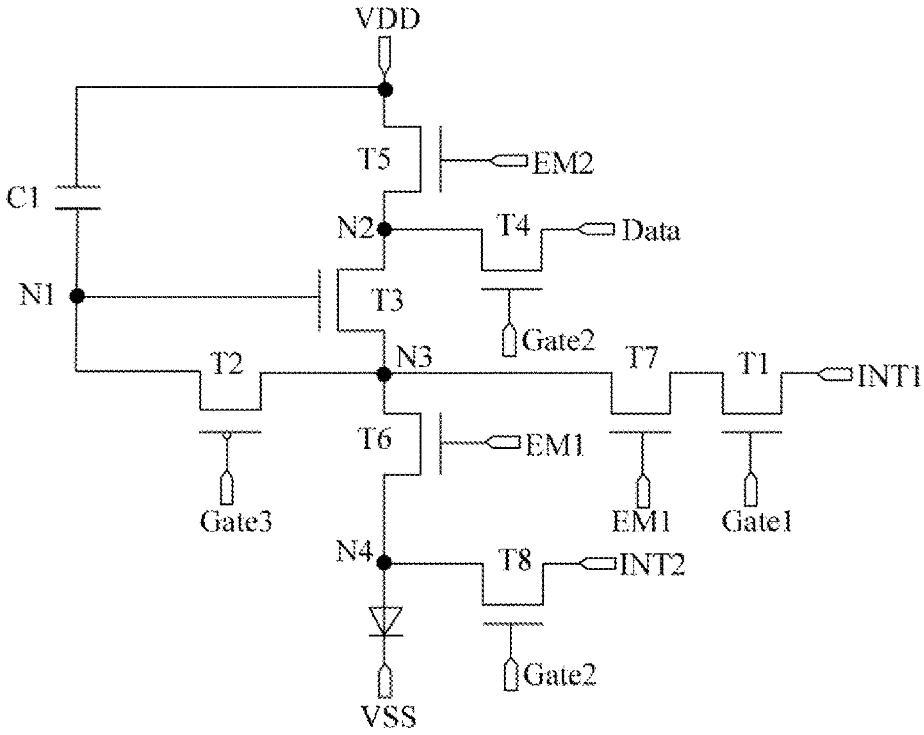
FIG. 14 is a third equivalent circuit diagram of a pixel circuit according to an embodiment of the present disclosure.

In an exemplary embodiment, as shown in FIG. 14, the second reset sub-circuit includes an eighth transistor T8. A control electrode of the eighth transistor T8 is connected with the second scanning signal terminal Gate2. A first electrode of the eighth transistor T8 is connected with the second initial signal terminal INT2. A second electrode of the eighth transistor T8 is connected with the fourth node N4.

In the present embodiment, a eighth transistor T8 is added to the fourth node N4 to reset the fourth node N4 (i.e., an anode terminal of the emitting element EL) independently. As such, the first node N1 and the fourth node N4 are different in reset voltage, and a respective control effect is achieved.

Figure 15:
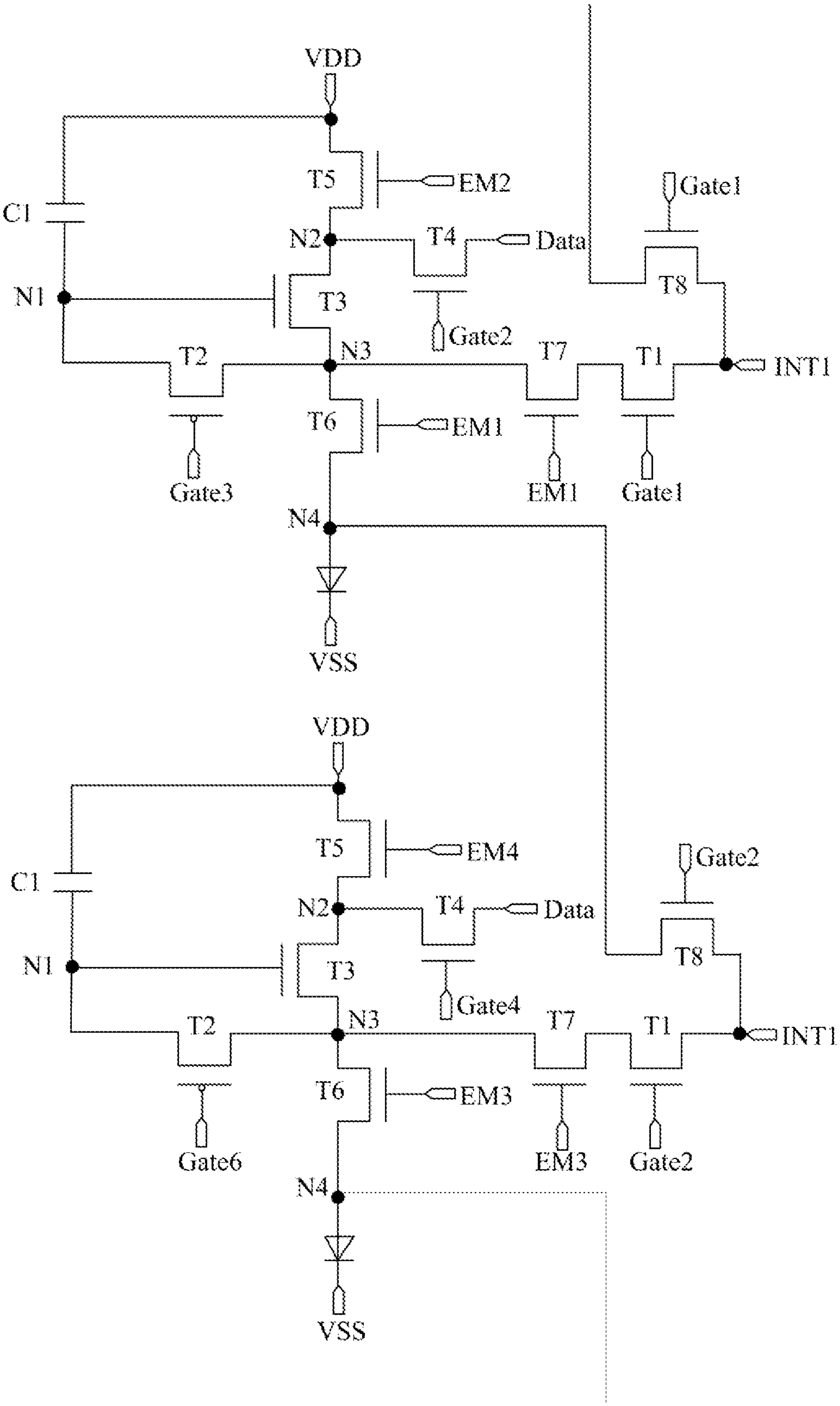
FIG. 15 is a second equivalent circuit diagram of pixel circuits of sub-pixels of two adjacent rows according to an embodiment of the present disclosure.

In an exemplary embodiment, as shown in FIG. 14, the control electrode of the eighth transistor T8 is connected with the second scanning signal terminal Gate2, and the control electrode of the first transistor T1 is connected with the first scanning signal terminal Gate1. Comparison between the signal of the first scanning signal terminal Gate1 and the signal of the second scanning signal terminal Gate2 in a scanning period shows that periods of low-level pulses thereof are the same and starting times are different only by a stage t1. Therefore, as shown in FIG. 15, an anode terminal of an emitting element in a pixel circuit of a sub-pixel of an ith row may be reset using an eighth transistor T8 in a pixel circuit of a sub-pixel of an (i+1)th row to make it convenient for an eighth transistor T8 and first transistor T1 in a sub-pixel of each row to share the same scanning signal line, facilitating the spatial layout of the pixel circuit and improving the display resolution. During pixel layout designing, both a channel region of the eighth transistor T8 and a channel region of the first transistor T1 in the sub-pixel of each row may extend in a first direction and are on the same straight line.

In FIG. 15, the eighth transistor T8 and first transistor T1 in the sub-pixel of each row share the same initial signal line INT1. In another exemplary embodiment, the eighth transistor T8 and first transistor T1 in the sub-pixel of each row may also use different initial signal lines respectively. For example, the first transistor T1 uses a first initial signal line INT1, and the eighth transistor T8 uses a second initial signal line INT2. No limits are made thereto in the present disclosure.

Figure 16:
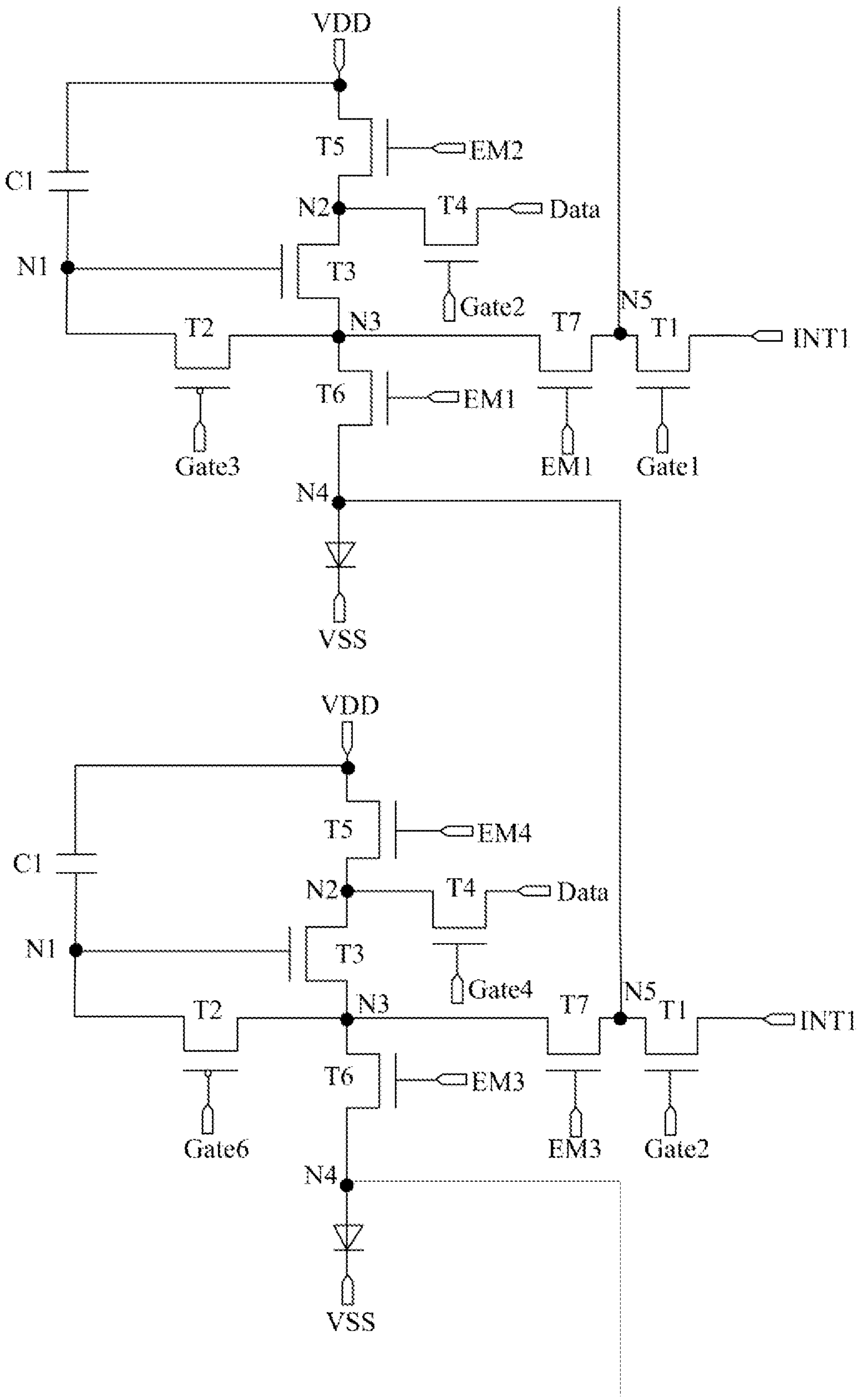
FIG. 16 is a third equivalent circuit diagram of pixel circuits of sub-pixels of two adjacent rows according to an embodiment of the present disclosure.

In an exemplary embodiment, as shown in FIG. 16, the anode terminal of the emitting element in the pixel circuit of the sub-pixel of the ith row may also be reset using a signal of a second electrode (i.e., a fifth node in FIG. 16) of the first transistor T1 in the pixel circuit of the sub-pixel of the (i+1)th row, thereby further reducing the number of thin film transistors to facilitate the spatial layout of the pixel circuit and improve the display resolution.

A fourth transistor T4 in the sub-pixel of the ith row may share the same scanning signal line with the first transistor T1 in the sub-pixel of the (i+1)th row. Therefore, during pixel layout designing, both a channel region of the fourth transistor T4 in the sub-pixel of the ith row and a channel region of the first transistor T1 in the sub-pixel of the (i+1)th row may extend in a first direction and are on the same straight line. In the present embodiment, the first direction may be an extending direction of the scanning signal line.

Figure 17:
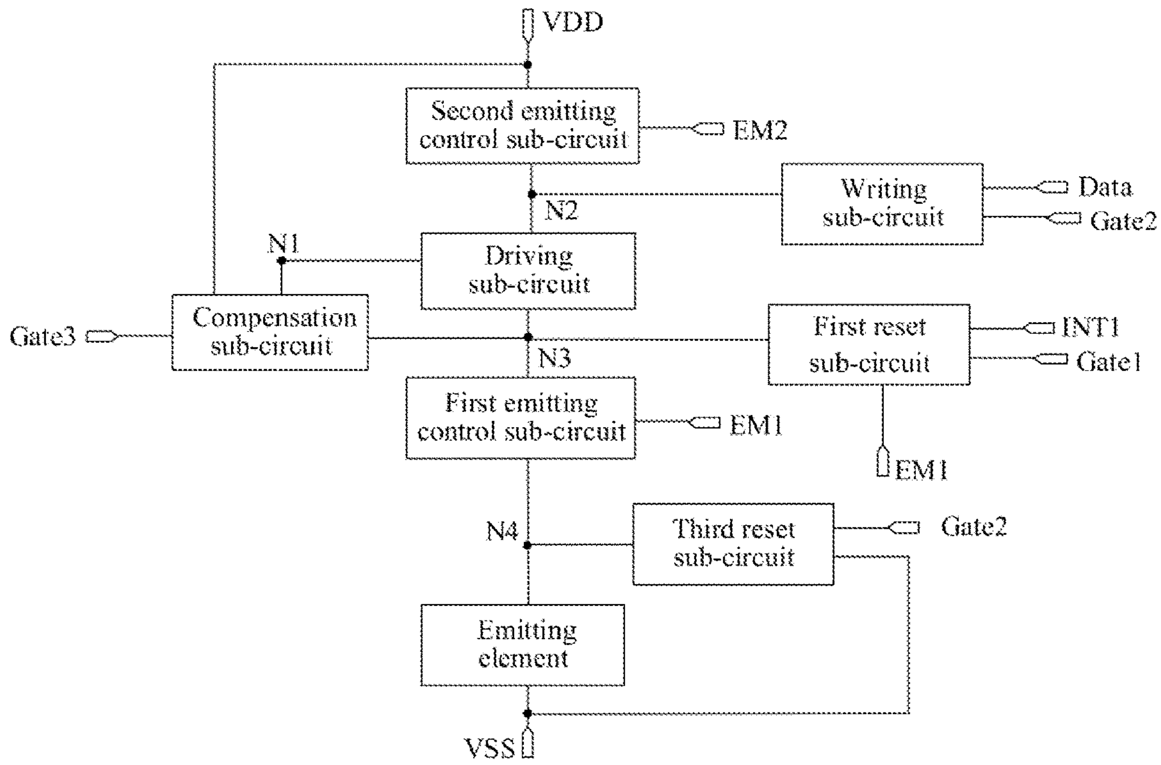
FIG. 17 is a third schematic diagram of a structure of a pixel circuit according to an embodiment of the present disclosure.

In another exemplary embodiment, as shown in FIG. 17, the pixel circuit further includes a third reset sub-circuit. The third reset sub-circuit is connected with the second scanning signal terminal Gate2, the second voltage terminal VSS, and the fourth node N4 respectively, and is configured to write a signal of the second voltage terminal VSS into the fourth node N4 under the control of the signal of the second scanning signal terminal Gate2.

Figure 18:
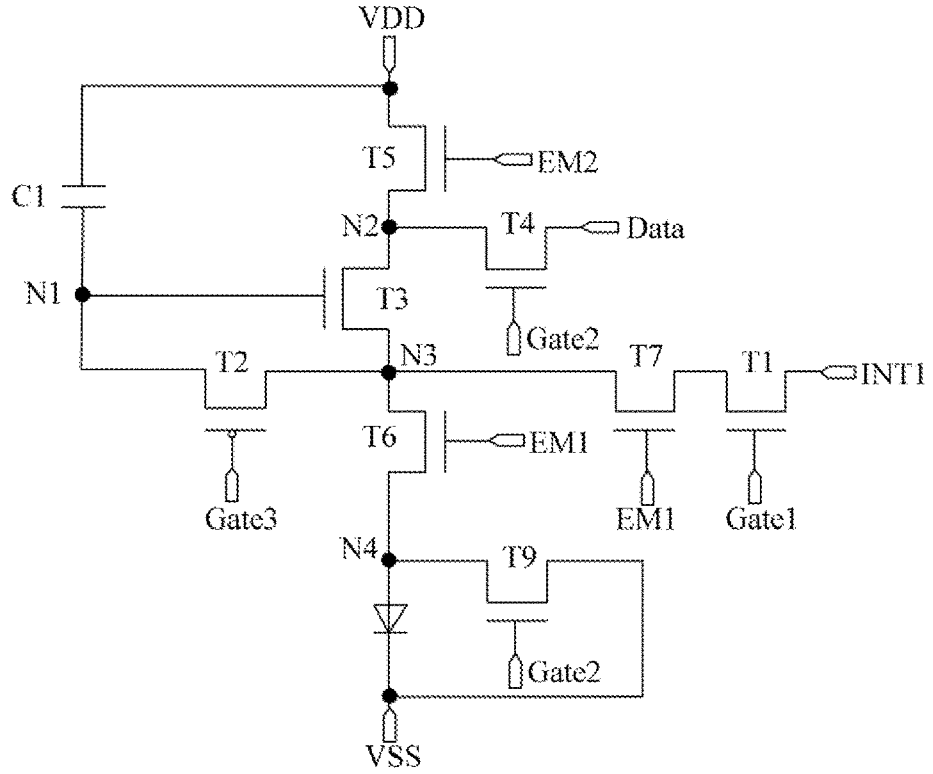
FIG. 18 is a fourth equivalent circuit diagram of a pixel circuit according to an embodiment of the present disclosure.

In an exemplary embodiment, as shown in FIG. 18, the third reset sub-circuit includes a ninth transistor T9. A control electrode of the ninth transistor T9 is connected with the second scanning signal terminal Gate2. A first electrode of the ninth transistor T9 is connected with the second voltage terminal VSS. A second electrode of the ninth transistor T9 is connected with the fourth node N4.

In the present embodiment, a ninth transistor T9 is added to the fourth node N4. The fourth node N4 (i.e., the anode terminal of the emitting element EL) is reset independently through the ninth transistor T9, and a reset voltage of the fourth node N4 is the same as the second voltage of the second voltage terminal VSS. As such, the first node N1 and the fourth node N4 are different in reset voltage, and a respective control effect is achieved. In addition, since the second voltage terminal VSS may be set dynamically according to different gray scales, a dynamic resetting effect is also achieved for the reset voltage of the fourth node N4.

Figure 19:
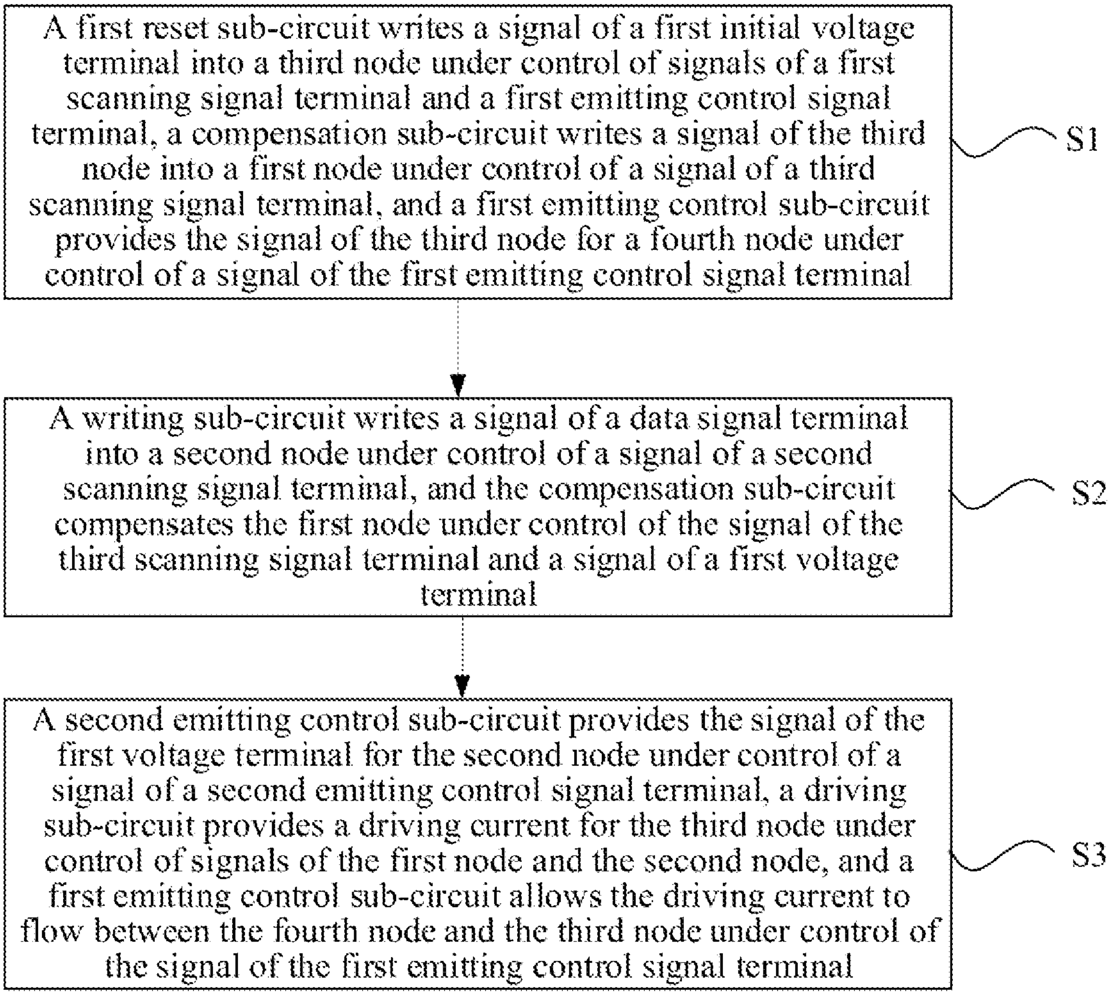
FIG. 19 is a schematic flowchart of a driving method for a pixel circuit according to an embodiment of the present disclosure.

Some embodiments of the present disclosure also provide a driving method for a pixel circuit, which is applied to the pixel circuit provided in the abovementioned embodiments. The pixel circuit includes a driving sub-circuit, a writing sub-circuit, a compensation sub-circuit, a first reset sub-circuit, a first emitting control sub-circuit, a second emitting control sub-circuit, an emitting element, a first scanning signal terminal, a second scanning signal terminal, a third scanning signal terminal, a first emitting control signal terminal, a second emitting control signal terminal, a first initial signal terminal, a data signal terminal, a first voltage terminal, and a second voltage terminal. FIG. 19 is a flowchart of a driving method for a pixel circuit according to an embodiment of the present disclosure. The pixel circuit has multiple scanning periods. As shown in FIG. 19, the driving method includes the following acts in a scanning period.

In S1, in a reset stage, the first reset sub-circuit writes a signal of the first initial voltage terminal into a third node under control of signals of the first scanning signal terminal and the first emitting control signal terminal, the compensation sub-circuit writes a signal of the third node into a first node under the control of a signal of the third scanning signal terminal, and the first emitting control sub-circuit provides the signal of the third node for a fourth node under control of the signal of the first emitting control signal terminal.

In the present act, a storage capacitor, an anode-terminal voltage of the emitting element, and a control electrode voltage of the driving sub-circuit are reset by initializing the third node through the first reset sub-circuit, initializing the first node through the compensation sub-circuit, and initializing the fourth node through the first emitting control sub-circuit. Remaining positive charges of the emitting element after the emitting element emitted light last time and charges remaining in the storage capacitor are eliminated.

In an exemplary embodiment, the pixel circuit further includes a second reset sub-circuit. The driving method further includes the second reset sub-circuit writes a signal of a second initial signal terminal into the fourth node under control of a signal of the second scanning signal terminal.

In another exemplary embodiment, the pixel circuit further includes a third reset sub-circuit. The driving method further includes the third reset sub-circuit writes a signal of the second voltage terminal into the fourth node under control of the signal of the second scanning signal terminal.

In S2, in a data writing stage, the writing sub-circuit writes a signal of the data signal terminal into a second node under control of the signal of the second scanning signal terminal, and the compensation sub-circuit compensates the first node under control of the signal of the third scanning signal terminal and a signal of the first voltage terminal.

In the present act, a data voltage signal is provided for the data signal terminal. When the first node is charged to Vdata-Vth, a driving transistor is turned off. Therefore, the compensation for a threshold voltage of the driving transistor is implemented, and the uniformity of a display image is improved.

In S3, in a light emitting stage, the second emitting control sub-circuit provides the signal of the first voltage terminal for the second node under the control of the signal of the second emitting control signal terminal, the driving sub-circuit provides a driving current for the third node under control of signals of the first node and the second node, and the first emitting control sub-circuit allows the driving current to flow between the fourth node and the third node under the control of the signal of the first emitting control signal terminal.

In the present act, the generated driving current is:

$$I=K^*(Vgs-Vth)^2=K^*[(Vdd-V\text{data}+Vth)-Vth]^2=K^*[(Vdd-Vd)]^2.$$

I is the driving current flowing through the driving transistor, i.e., the driving current for driving the emitting element. K is a constant. Vgs is a voltage difference between a gate electrode and first electrode of the driving transistor. Vth is the threshold voltage of the driving transistor. Vdata is a data voltage output by the data signal terminal. Vdd is a power voltage output by the first power terminal.

In an exemplary embodiment, between the data writing stage and the light emitting stage the driving method further includes in one or more blank stages, at least one of the first emitting control sub-circuit and the second emitting control sub-circuit forbids the driving current to flow through, wherein the one or more blank stages is used for enabling pulse widths of the signals of the first scanning signal terminal, the second scanning signal terminal, and the third scanning signal terminal in a scanning period to be same.

According to the driving method for the pixel circuit in the embodiment of the present disclosure, remaining positive charges of the emitting element after the emitting element emitted light last time are eliminated, the compensation for the gate voltage of the thin film transistor is implemented, and the uniformity of a display image and the display quality of a display panel are improved. In addition, according to the driving method for the pixel circuit of the embodiment of the present disclosure, there are fewer leakage channels, so that the low-frequency flicker effect is improved. Moreover, the pixel circuit of the embodiment of the present disclosure does not need a double-gate design, so that the space occupied by the pixel circuit is reduced, and the screen resolution is improved.

Based on the same inventive concept, an embodiment of the present disclosure also provides a display apparatus, which includes a pixel circuit provided in the abovementioned embodiments. The display apparatus of the present disclosure may be any product or component with a display function, such as a mobile phone, a tablet computer, a television, a display, a notebook computer, a digital photo frame, or a navigator. In an exemplary implementation, the display apparatus may be a wearable display apparatus that a human body may wear in some manners, such as a smart watch and a smart band.

The following points need to be noted.

The drawings of the embodiments of the present disclosure only involve the structures involved in the embodiments of the present disclosure, and the other structures may refer to conventional designs.

The embodiments in the present disclosure, i.e., the features in the embodiments, can be combined without conflicts to obtain new embodiments.

Although the implementations of the present disclosure are disclosed above, the contents are only implementations adopted to easily understand the present disclosure and not intended to limit the present disclosure. Those skilled in the art may make any modifications and variations to implementation forms and details without departing from the spirit and scope disclosed by the present disclosure. However, the scope of patent protection of the present disclosure should also be subject to the scope defined by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A pixel circuit, comprising a driving sub-circuit, a writing sub-circuit, a compensation sub-circuit, a first reset sub-circuit, and an emitting element, wherein the driving sub-circuit is connected with a first node, a second node, and a third node respectively, and is configured to provide a driving current for the third node under control of signals of the first node and the second node;

the writing sub-circuit is connected with a second scanning signal terminal, a data signal terminal, and the second node respectively, and is configured to write a signal of the data signal terminal into the second node under control of a signal of the second scanning signal terminal;

the first reset sub-circuit is connected with a first scanning signal terminal, a first emitting control signal terminal, a first initial signal terminal, and the third node respectively, and is configured to write an initial voltage signal of the first initial signal terminal into the third node under control of signals of the first scanning signal terminal and the first emitting control signal terminal;

the compensation sub-circuit is connected with a first voltage terminal, a third scanning signal terminal, the first node, and the third node respectively, and is configured to write the initial voltage signal of the third node into the first node under control of a signal of the third scanning signal terminal and compensate the first node under control of the signal of the third scanning signal terminal; and one terminal of the emitting element is connected with a fourth node, while the other terminal is connected with a second voltage terminal.

2. The pixel circuit according to claim 1, further comprising:

a first emitting control sub-circuit, wherein the first emitting control sub-circuit is connected with the first emitting control signal terminal, the third node, and the fourth node respectively, and is configured to provide the signal of the third node for the fourth node under control of the signal of the first emitting control signal terminal and allow the driving current to flow between the third node and the fourth node.

3. The pixel circuit according to claim 2, further comprising: a second emitting control sub-circuit, wherein the second emitting control sub-circuit is connected with the first voltage terminal, a second emitting control signal terminal, and the second node respectively, and is configured to, after a data writing stage and before a light emitting stage, provide a signal of the first voltage terminal for the second node.

4. The pixel circuit according to claim 1, wherein the first reset sub-circuit comprises a first transistor and a seventh transistor;

a control electrode of the first transistor is connected with the first scanning signal terminal, a first electrode of the first transistor is connected with the first initial signal terminal, and a second electrode of the first transistor is connected with a first electrode of the seventh transistor; and a control electrode of the seventh transistor is connected with the first emitting control signal terminal, and a second electrode of the seventh transistor is connected with the third node.

5. The pixel circuit according to claim 1, wherein the compensation sub-circuit comprises a second transistor and a first capacitor, the driving sub-circuit comprises a third transistor, and the writing sub-circuit comprises a fourth transistor;

a control electrode of the second transistor is connected with the third scanning signal terminal, a first electrode of the second transistor is connected with the third node, and a second electrode of the second transistor is connected with the first node;

one terminal of the first capacitor is connected with the first node, and the other terminal of the first capacitor is connected with the first voltage terminal;

a control electrode of the third transistor is connected with the first node, a first electrode of the third transistor is connected with the second node, and a second electrode of the third transistor is connected with the third node; and a control electrode of the fourth transistor is connected with the second scanning signal terminal, a first electrode of the fourth transistor is connected with the data signal terminal, and a second electrode of the fourth transistor is connected with the second node.

6. The pixel circuit according to claim 3, wherein the second emitting control sub-circuit comprises a fifth transistor, and the first emitting control sub-circuit comprises a sixth transistor;

a control electrode of the fifth transistor is connected with the second emitting control signal terminal, a first electrode of the fifth transistor is connected with the first voltage terminal, and a second electrode of the fifth transistor is connected with the second node; and a control electrode of the sixth transistor is connected with the first emitting control signal terminal, a first electrode of the sixth transistor is connected with the third node, and a second electrode of the sixth transistor is connected with the fourth node.

7. The pixel circuit according to claim 3, wherein the first reset sub-circuit comprises a first transistor and a seventh transistor, the compensation sub-circuit comprises a second transistor and a first capacitor, the driving sub-circuit comprises a third transistor, the writing sub-circuit comprises a fourth transistor, the second emitting control sub-circuit comprises a fifth transistor, and the first emitting control sub-circuit comprises a sixth transistor;

a control electrode of the first transistor is connected with the first scanning signal terminal, a first electrode of the first transistor is connected with the first initial signal terminal, and a second electrode of the first transistor is connected with a first electrode of the seventh transistor;

a control electrode of the seventh transistor is connected with the first emitting control signal terminal, and a second electrode of the seventh transistor is connected with the third node;

a control electrode of the second transistor is connected with the third scanning signal terminal, a first electrode of the second transistor is connected with the third node, and a second electrode of the second transistor is connected with the first node;

one terminal of the first capacitor is connected with the first node, and the other terminal of the first capacitor is connected with the first voltage terminal;

a control electrode of the third transistor is connected with the first node, a first electrode of the third transistor is connected with the second node, and a second electrode of the third transistor is connected with the third node;

a control electrode of the fourth transistor is connected with the second scanning signal terminal, a first electrode of the fourth transistor is connected with the data signal terminal, and a second electrode of the fourth transistor is connected with the second node;

a control electrode of the fifth transistor is connected with the second emitting control signal terminal, a first electrode of the fifth transistor is connected with the first voltage terminal, and a second electrode of the fifth transistor is connected with the second node; and a control electrode of the sixth transistor is connected with the first emitting control signal terminal, a first electrode of the sixth transistor is connected with the third node, and a second electrode of the sixth transistor is connected with the fourth node.

8. The pixel circuit according to claim 7, wherein all of the first transistor to the seventh transistor are Low Temperature Poly Silicon (LTPS) Thin Film Transistors (TFTs), and the signal of the third scanning signal terminal is the same as that of the first scanning signal terminal.

9. The pixel circuit according to claim 7, wherein all of the first transistor, and the third transistor to the seventh transistor are Low Temperature Poly Silicon (LTPS) Thin Film Transistors (TFTs), the second transistor is an Indium Gallium Zinc Oxide (IGZO) thin film transistor, and the signal of the third scanning signal terminal is opposite to that of the first scanning signal terminal.

10. The pixel circuit according to claim 1, further comprising a second reset sub-circuit, wherein the second reset sub-circuit is connected with the second scanning signal terminal, a second initial signal terminal, and the fourth node respectively, and is configured to write a signal of the second initial signal terminal into the fourth node under control of the signal of the second scanning signal terminal.

11. The pixel circuit according to claim 10, wherein the second reset sub-circuit comprises an eighth transistor, a control electrode of the eighth transistor is connected with the second scanning signal terminal, a first electrode of the eighth transistor is connected with the second initial signal terminal, and a second electrode of the eighth transistor is connected with the fourth node.

12. The pixel circuit according to claim 1, further comprising a third reset sub-circuit, wherein the third reset sub-circuit is connected with the second scanning signal terminal, the second voltage terminal, and the fourth node respectively, and is configured to write a signal of the second voltage terminal into the fourth node under control of the signal of the second scanning signal terminal.

13. The pixel circuit according to claim 12, wherein the third reset sub-circuit comprises a ninth transistor, a control electrode of the ninth transistor is connected with the second scanning signal terminal, a first electrode of the ninth transistor is connected with the second voltage terminal, and a second electrode of the ninth transistor is connected with the fourth node.

14. A display apparatus, comprising the pixel circuit according to claim 1.

15. A driving method for a pixel circuit, used for driving the pixel circuit according to claim 1 and comprising:

in a reset stage, writing, by a first reset sub-circuit, a signal of a first initial voltage terminal into a third node under control of signals of a first scanning signal terminal and a first emitting control signal terminal, writing, by a compensation sub-circuit, a signal of the third node into a first node under control of a signal of a third scanning signal terminal, and providing, by a first emitting control sub-circuit, the signal of the third node for a fourth node under control of a signal of the first emitting control signal terminal;

in a data writing stage, writing, by a writing sub-circuit, a signal of a data signal terminal into a second node under control of a signal of a second scanning signal terminal, and compensating, by the compensation sub-circuit, the first node under control of the signal of the third scanning signal terminal and a signal of a first voltage terminal; and in a light emitting stage, providing, by a second emitting control sub-circuit, the signal of the first voltage terminal for the second node under control of the signal of the second emitting control signal terminal, providing, by a driving sub-circuit, a driving current for the third node under control of signals of the first node and the second node, and allowing, by the first emitting control sub-circuit, the driving current to flow between the fourth node and the third node under control of the signal of the first emitting control signal terminal.

16. The driving method according to claim 15, between the data writing stage and the light emitting stage, further comprising:

in one or more blank stages, forbidding, by at least one of the first emitting control sub-circuit and the second emitting control sub-circuit, the driving current to flow through, wherein the one or more blank stages is used for enabling pulse widths of signals of the first scanning signal terminal, the second scanning signal terminal, and the third scanning signal terminal in a scanning period to be same.

17. The driving method according to claim 15, further comprising:

in a blank stage, providing, by the second emitting control sub-circuit, a signal of the first voltage terminal for the second node, to reset the second node.

18. The pixel circuit according to claim 4, further comprising a second reset sub-circuit, wherein the second reset sub-circuit is connected with the second scanning signal terminal, a second initial signal terminal, and the fourth node respectively, and is configured to write a signal of the second initial signal terminal into the fourth node under control of the signal of the second scanning signal terminal.

19. The pixel circuit according to claim 5, further comprising a second reset sub-circuit, wherein the second reset sub-circuit is connected with the second scanning signal terminal, a second initial signal terminal, and the fourth node respectively, and is configured to write a signal of the second initial signal terminal into the fourth node under control of the signal of the second scanning signal terminal.

20. The pixel circuit according to claim 2, further comprising a third reset sub-circuit, wherein the third reset sub-circuit is connected with the second scanning signal terminal, the second voltage terminal, and the fourth node respectively, and is configured to write a signal of the second voltage terminal into the fourth node under control of the signal of the second scanning signal terminal.

* * * * *